United States Patent
Schwellenbach et al.

(10) Patent No.: US 12,313,609 B2
(45) Date of Patent: May 27, 2025

(54) CHROMATOGRAPHY METHOD, METHOD OF DETERMINING THE CONCENTRATION OF AT LEAST ONE COMPOUND IN CHROMATOGRAPHY METHOD AND METHOD OF OBTAINING AT LEAST ONE CHROMATOGRAPHY METHOD PARAMETER

(71) Applicant: Sartorius Stedim Biotech GmbH, Göttingen (DE)

(72) Inventors: Jan Schwellenbach, Göttingen (DE); Volkmar Thom, Göttingen (DE); Dominik Stein, Göttingen (DE)

(73) Assignee: Sartorius Stedim Biotech GmbH (DE)

( * ) Notice: Subject to any disclaimer, the term of this patent is extended or adjusted under 35 U.S.C. 154(b) by 424 days.

(21) Appl. No.: 17/611,868

(22) PCT Filed: May 8, 2020

(86) PCT No.: PCT/EP2020/062830
§ 371 (c)(1),
(2) Date: Nov. 16, 2021

(87) PCT Pub. No.: WO2020/239388
PCT Pub. Date: Dec. 3, 2020

(65) Prior Publication Data
US 2022/0214319 A1    Jul. 7, 2022

(30) Foreign Application Priority Data
May 24, 2019 (EP) .................................. 19176462

(51) Int. Cl.
G01N 30/88    (2006.01)
G01N 30/86    (2006.01)

(52) U.S. Cl.
CPC ......... *G01N 30/8658* (2013.01); *G01N 30/88* (2013.01); *G01N 2030/8831* (2013.01)

(58) Field of Classification Search
CPC ............... G01N 30/8658; G01N 30/88; G01N 2030/8831
See application file for complete search history.

(56) References Cited

U.S. PATENT DOCUMENTS

| 3,728,526 A | 4/1973 | Youngblood |
| 4,364,263 A | 12/1982 | Sankoorikal et al. |

(Continued)

FOREIGN PATENT DOCUMENTS

| CN | 102271775 A | 12/2011 |
| CN | 102323360 A | 1/2012 |

(Continued)

OTHER PUBLICATIONS

Ahmad et al., "Numerical determination of the adsorption isotherms of tryptophan at different temperatures and mobile phase compositions," *Journal of Chromatography A* 1142(2): 148-163, Feb. 2007.

(Continued)

*Primary Examiner* — David J Bolduc
(74) *Attorney, Agent, or Firm* — Klarquist Sparkman, LLP

(57) ABSTRACT

Chromatography methods, methods of determining the concentration of at least one compound in a chromatography method and methods of obtaining at least one chromatography method parameter are provided. The chromatography methods include performance based on results obtained from the methods of determining the concentration of at least one compound or methods of obtaining at least one chromatography method parameter.

14 Claims, 8 Drawing Sheets

(56) References Cited

U.S. PATENT DOCUMENTS

| | | | |
|---|---|---|---|
| 4,579,663 A | 4/1986 | Polie et al. | |
| 4,592,842 A | 6/1986 | Tomlinson | |
| 4,631,687 A | 12/1986 | Kowalski et al. | |
| 4,762,617 A | 8/1988 | Stevens | |
| 4,772,388 A | 9/1988 | Allington | |
| 4,865,746 A * | 9/1989 | Overfield | G01N 30/88 210/198.2 |
| 4,869,093 A * | 9/1989 | Gilbert | G01N 30/88 422/89 |
| 4,941,101 A | 7/1990 | Crilly | |
| 5,039,409 A | 8/1991 | Blaffert et al. | |
| 5,135,549 A | 8/1992 | Phillips et al. | |
| 5,135,657 A * | 8/1992 | Zavitsanos | G01N 30/08 210/635 |
| 5,240,603 A * | 8/1993 | Frank | B01D 11/0203 210/659 |
| 5,265,031 A | 11/1993 | Malczewski | |
| 5,322,626 A * | 6/1994 | Frank | B01D 11/0203 210/659 |
| 5,384,042 A * | 1/1995 | Afeyan | B01D 15/345 502/402 |
| 5,437,179 A | 8/1995 | Weigand et al. | |
| 5,543,315 A | 8/1996 | Sugiyama et al. | |
| 5,549,819 A * | 8/1996 | Nickerson | B01D 11/0407 210/511 |
| 5,567,227 A | 10/1996 | Henderson | |
| 5,582,736 A | 12/1996 | Hotier et al. | |
| 5,589,630 A | 12/1996 | Wiegand et al. | |
| 5,804,142 A | 9/1998 | Ito et al. | |
| 5,938,931 A | 8/1999 | Ono et al. | |
| 6,019,896 A | 2/2000 | Mansfield et al. | |
| 6,036,856 A | 3/2000 | Ono et al. | |
| 6,175,409 B1 * | 1/2001 | Nielsen | G01N 30/60 356/337 |
| 6,260,407 B1 * | 7/2001 | Petro | G01N 30/30 73/61.52 |
| 6,265,226 B1 * | 7/2001 | Petro | B01J 19/0046 422/63 |
| 6,294,388 B1 * | 9/2001 | Petro | G01N 30/16 436/19 |
| 6,360,588 B1 | 3/2002 | Ross et al. | |
| 6,551,512 B1 * | 4/2003 | Britsch | B01D 15/1828 210/659 |
| 6,613,224 B1 | 9/2003 | Strand | |
| 6,737,376 B1 | 5/2004 | Heckmann et al. | |
| 7,018,540 B2 | 3/2006 | Brann | |
| 9,766,217 B2 | 9/2017 | Kidal et al. | |
| 2001/0027949 A1 * | 10/2001 | Safir | B01D 15/08 210/635 |
| 2002/0010566 A1 | 1/2002 | Chester et al. | |
| 2002/0115566 A1 * | 8/2002 | Sessler | B01J 20/286 540/472 |
| 2003/0116195 A1 | 6/2003 | Weissgerber et al. | |
| 2003/0159993 A1 * | 8/2003 | Yin | G01N 30/34 210/656 |
| 2003/0203502 A1 * | 10/2003 | Zenhausern | G01N 21/552 356/310 |
| 2004/0101990 A1 * | 5/2004 | Dunn | G01N 29/222 257/E27.006 |
| 2005/0009175 A1 * | 1/2005 | Bergh | B01L 3/502707 435/287.2 |
| 2005/0230616 A1 * | 10/2005 | Cameron | G01N 30/88 250/282 |
| 2006/0120683 A1 * | 6/2006 | Kamp | G02B 6/1225 385/140 |
| 2007/0215534 A1 * | 9/2007 | Thommes | B01D 15/185 210/198.2 |
| 2008/0092639 A1 * | 4/2008 | Lee | G01N 30/32 73/198 |
| 2008/0223794 A1 * | 9/2008 | Yamamichi | B81B 1/00 210/767 |
| 2010/0004907 A1 | 1/2010 | Kidal et al. | |
| 2010/0055664 A1 * | 3/2010 | Zheng | G01N 33/54366 435/287.1 |
| 2010/0252502 A1 | 10/2010 | Witt | |
| 2012/0118144 A1 * | 5/2012 | Cates | G01N 1/2273 96/102 |
| 2012/0283959 A1 | 11/2012 | Ruzic et al. | |
| 2013/0173014 A1 * | 7/2013 | Mikos | A61L 27/3608 623/23.61 |
| 2013/0319086 A1 * | 12/2013 | Wyndham | B01J 20/29 73/61.54 |
| 2015/0129474 A1 * | 5/2015 | Bouvier | G01N 30/30 29/428 |
| 2015/0298025 A1 * | 10/2015 | Schultz | B01D 15/10 250/281 |
| 2015/0321191 A1 * | 11/2015 | Kendall | B01J 20/3255 521/149 |
| 2015/0343372 A1 * | 12/2015 | Marei | B01D 53/229 204/266 |
| 2017/0322190 A1 | 11/2017 | Nyholm et al. | |
| 2018/0128096 A1 * | 5/2018 | Cox | E21B 49/00 |
| 2018/0180580 A1 * | 6/2018 | Tadigadapa | B01D 53/025 |
| 2018/0284085 A1 * | 10/2018 | Arigo | G01N 25/4866 |
| 2019/0083951 A1 * | 3/2019 | Buchner, Sr. | B01J 19/0033 |
| 2019/0170705 A1 * | 6/2019 | Wyndham | G01N 30/72 |
| 2019/0250076 A1 * | 8/2019 | Tsai | G01N 15/0618 |
| 2020/0300820 A1 * | 9/2020 | Tarafder | G01N 30/38 |
| 2020/0348274 A1 * | 11/2020 | Wang | B01D 15/422 |
| 2020/0378985 A1 * | 12/2020 | Ray | H01J 49/36 |
| 2021/0187476 A1 | 6/2021 | Öhman et al. | |
| 2021/0239662 A1 | 8/2021 | Widehammar et al. | |
| 2022/0026405 A1 * | 1/2022 | Kartanas | G01N 15/1484 |

FOREIGN PATENT DOCUMENTS

| | | |
|---|---|---|
| CN | 103182198 A | 7/2013 |
| CN | 105518454 A | 4/2016 |
| CN | 106596761 A | 4/2017 |
| CN | 106596815 A | 4/2017 |
| CN | 107110835 A | 8/2017 |
| CN | 109092276 A | 12/2018 |
| EP | 0 359 320 A2 | 3/1990 |
| WO | WO9832790 A1 | 7/1998 |
| WO | WO2005121776 A1 | 12/2005 |
| WO | WO 2008/028974 A1 | 3/2008 |
| WO | WO2014030537 A1 | 2/2014 |

OTHER PUBLICATIONS

Berridge, "Chemometrics and method development in high-performance liquid chromatography part 1: Introduction," *Chemometrics and Intelligent Laboratory Systems* 3(3): 175-188, Mar. 1988.

Field et al., "High-throughput investigation of single and binary protein adsorption isotherms in anion exchange chromatography employing multivariate analysis," *Journal of Chromatography A* 1510: 13-24, Jun. 2017.

Gritti et al., "Effect of the mobile phase composition on the isotherm parameters and the high concentration band profiles in reversed-phase liquid chromatography," *Journal of Chromatography A* 995(1-2): 37-54, May 2003.

Grom et al., "Protein A affinity chromatography of Chinese hamster ovary (CHO) cell culture broths containing biopharmaceutical monoclonal antibody (mAb): Experiments and mechanistic transport, binding and equilibrium modeling," *Journal of Chromatography B* 1083: 44-56, Mar. 2018.

Hupe et al., "Selection of optimal conditions in preparative liquid chromatography: I. Theory," *Journal of Chromatography A* 203: 41-52, Jan. 1981.

International Search Report and Written Opinion, mailed Aug. 3, 2020, issued for International Patent Application No. PCT/EP2020/062830, 13 pages.

Mao et al., "Optimization of affinity and ion-exchange chromatographic processes for the purification of proteins," *Biotechnology and Bioengineering* 52(2): 204-222, Jun. 2014.

Piatkowski et al., "Adsorbed solution model for prediction of normal-phase chromatography process with varying composition of

(56) References Cited

OTHER PUBLICATIONS the mobile phase," *Journal of Chromatography A* 1092(1): 65-75, Oct. 2005.
Schwellenbach et al., "Purification of monoclonal antibodies using a fiber based cation-exchange stationary phase: parameter determination and modeling." *Bioengineering* 3(4): 24, Dec. 2016.
Vizhemehr et al., "Modeling of gas-phase filter model for high- and low-challenge gas concentrations," *Building and Environment* 80: 192-203, Jun. 2014.
Gritti et al, "Application of the General Height Equivalent to a Theoretical Plate Equation to Size Exclusion Chromatography," Study of the Mass Transfer of High-Molecular-Mass Compounds in Liquid Chromatography, Fabrice Anal. Chem. 2007, 79, 3188-3198.

\* cited by examiner

Figure 3

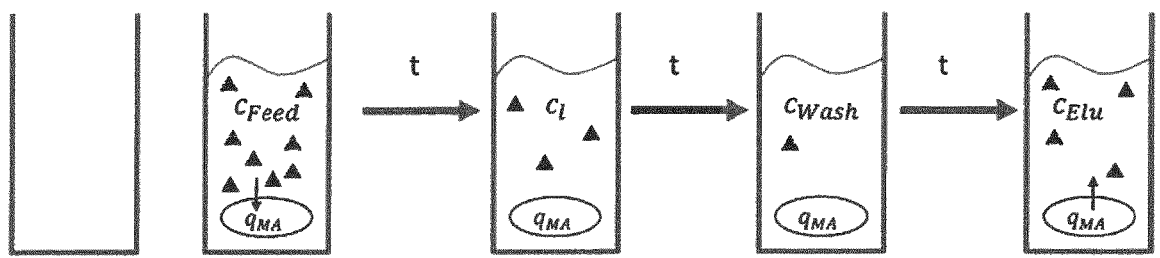

▲ : binding components
◯ : stationary phase
$c_{Feed}$ : concentration feed solution
$c_l$ : concentration in liquid after saturation of stationary phase
$c_{Wash}$ : concentration in liquid unbound components in wash
$c_{Elu}$ : concentration in liquid under elution conditions
$q_{MA}$ : binding capacity stationary phase
t : residence time

Figure 4

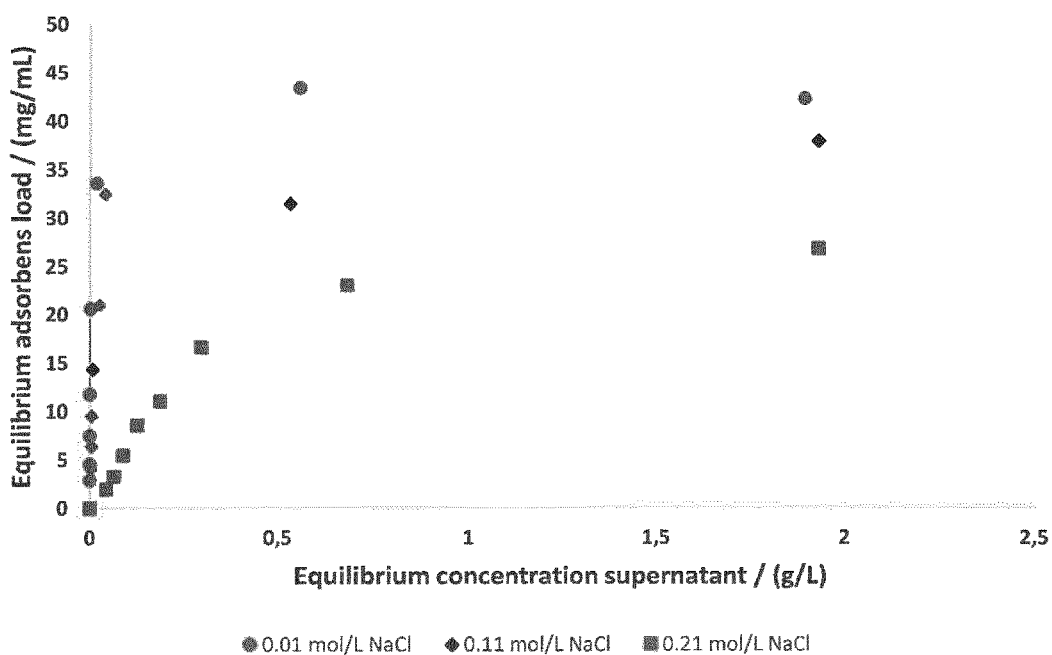

● 0.01 mol/L NaCl    ◆ 0.11 mol/L NaCl    ■ 0.21 mol/L NaCl

Figure 11
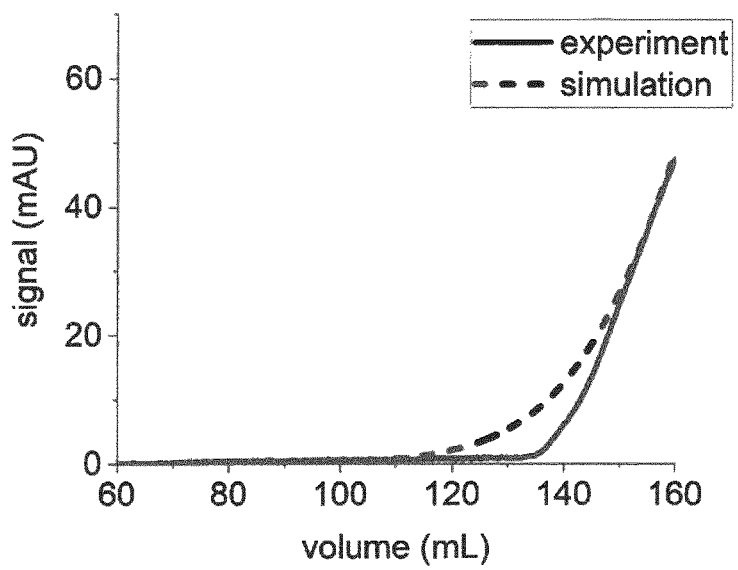
Figure 12
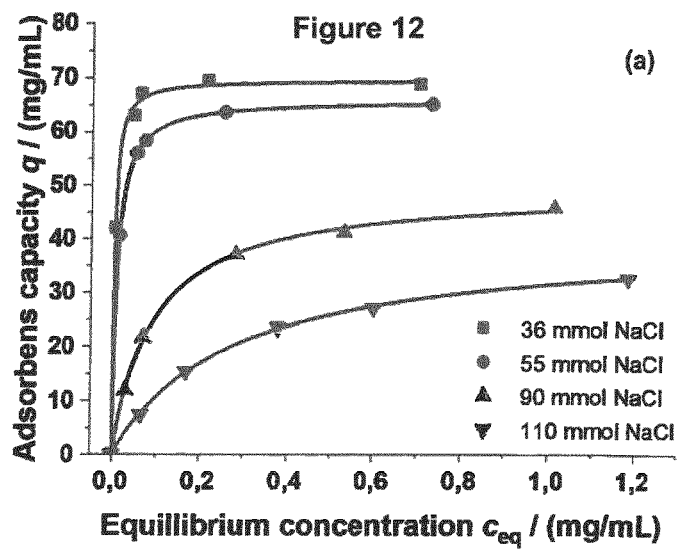
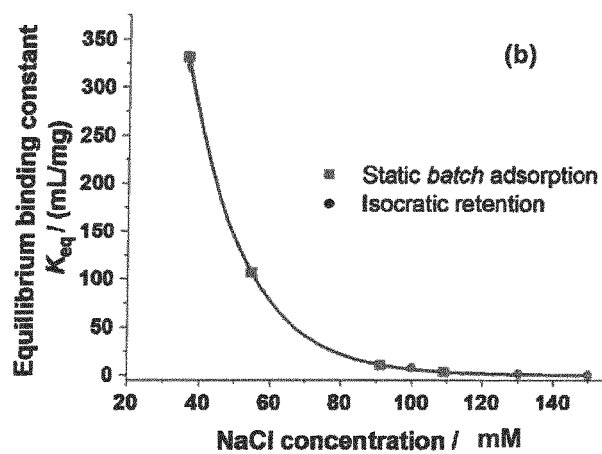
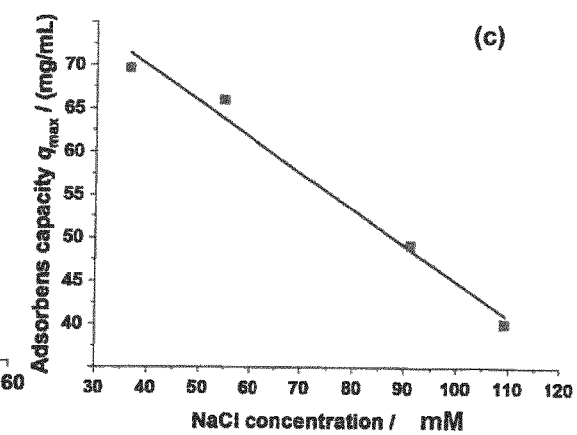

CHROMATOGRAPHY METHOD, METHOD OF DETERMINING THE CONCENTRATION OF AT LEAST ONE COMPOUND IN CHROMATOGRAPHY METHOD AND METHOD OF OBTAINING AT LEAST ONE CHROMATOGRAPHY METHOD PARAMETER

CROSS REFERENCE TO RELATED APPLICATIONS

This is the U.S. National Stage of International Application No. PCT/EP2020/062830, filed May 8, 2020, which was published in English under PCT Article 21(2), which in turn claims the benefit of European Application No. 19 176 462.0, filed May 24, 2019. The prior applications are incorporated herein by reference in their entirety.

The present invention relates to a chromatography method, a method of determining the concentration of at least one compound in a chromatography method and a method of obtaining at least one chromatography method parameter. The chromatography is carried out based on the results obtained from either the method of determining the concentration of at least one compound or the method of obtaining at least one chromatography method parameter.

The analysis and modelling of mass-transfer mechanisms and kinetic phenomena involved during chromatographic operations is an important tool regarding scale-up purposes, quality-by-design approaches as well as process integration and optimization (Schwellenbach, Jan; Zobel, Steffen; Taft, Florian; Villain, Louis; Strube, Jochen (2016): Purification of Monoclonal Antibodies Using a Fiber Based Cation-Exchange Stationary Phase: Parameter Determination and Modeling. In Bioengineering (Basel, Switzerland) 3 (4). DOI: 10.3390/bioengineering3040024). Numerous mathematical models have been proposed to describe concentration profiles obtained during chromatographic operations, characterized by different complexity levels in the description of the relevant mass-transport phenomena.

The general rate model (GRM) can be seen as the most universal model describing chromatography utilizing spherical porous particles. In this model, convection, axial dispersion and other mass-transport resistances are taken into account (Guiochon, Georges; Shirazi, Dean G.; Felinger, Attila; Katti, Anita M. (2006): Fundamentals of preparative and nonlinear chromatography. 2nd ed. Boston: Academic Press). This includes the external mass transfer of solute molecules from the mobile phase to the external surface of the adsorbent particle, the diffusion within the particle and the adsorption-desorption process at the ligand sites, commonly described by various sorption isotherms like steric-mass-action (SMA), Langmuir or Freundlich. The general rate model can be rearranged in simplified forms in which different mass transfer processes are expressed as a single term. The model parameter determination, however, is lengthy and labor intensive.

In order to obtain a simplified method for modelling chromatographic processes, it has been proposed disregarding mass transfer (see U.S. Pat. No. 9,766,217 B2). However, such a simplification results in a model that may yield inaccurate results.

In view of the above, the technical problem underlying the present invention is to provide a method of determining the concentration of a compound in a chromatography method that should be simple and yield accurate results; to provide a method for obtaining chromatography method parameters using the afore-mentioned method of determining the concentration; and a chromatography method employing the method of determining the concentration or the method for obtaining chromatography method parameters.

The solution to the above technical problem is achieved by providing the subject matter characterized in the claims.

In a first aspect, the present invention relates to a method of determining the concentration of at least one compound in a chromatography method comprising the steps of (ia) selecting the at least one compound; (ib) selecting a stationary phase; (ic) selecting a mobile phase; (id) selecting a chromatography device having a chromatography bed comprising the stationary phase and the mobile phase; (iia) obtaining an adsorption isotherm of the at least one compound on the stationary phase; (iib) obtaining the maximum diffusion time $t_{diff}$ of the at least one compound in the mobile phase; (iii) selecting a minimum residence time $t_{res}$ of the at least one compound in the chromatography bed such that Equation I is satisfied $$t_{res} > t_{diff} \qquad \text{Equation I:}$$

(iv) calculating a concentration $c(z, t)$ of the at least one compound in the mobile phase at a predetermined location z of the chromatography device and at a predetermined time t based on the adsorption isotherm.

By (iii) selecting the minimum residence time $t_{res}$ as described above, the influence of diffusion in the chromatography method can be neglected. Thus, even in case diffusion is not taken into account, the concentration(s) $c(z, t)$ can be reliably calculated. The present invention provides a simple method for modelling a chromatographic process which makes it possible to make accurate predictions and which can be used for obtaining appropriate chromatography parameters, e.g. for the sake of a scale-up from a laboratory frame to an industrial level.

According to a preferred embodiment of the present invention, step (iv) is carried out without taking the diffusion of the at least one compound in the mobile phase into account. Thereby, it is not only possible to calculate the concentration(s) $c(z, t)$ with a high accuracy but also in a simple and fast manner.

Chromatography is a physical method of separation in which the components to be separated are distributed between two phases, one of which is stationary (stationary phase) while the other one (the mobile phase) moves in a predetermined direction.

The method of the present invention is not limited to a specific type of chromatography. For instance, the inventive method can be used for adsorption chromatography, affinity chromatography, column chromatography, displacement chromatography, elution chromatography, exclusion chromatography, size-exclusion chromatography, gel-permeation chromatography, frontal chromatography, gas chromatography, ion-exchange chromatography, hydrophobic interaction chromatography, mixed-mode chromatography, isothermal chromatography, liquid chromatography, normal-phase chromatography, partition chromatography, planar chromatography, programmed-flow chromatography, programmed-pressure chromatography, programmed-temperature chromatography, pyrolysis-gas chromatography, reaction chromatography, reversed-phase chromatography, supercritical fluid chromatography, two-dimensional chromatography and the like. The method according to the present invention is particularly suited for ion-exchange chromatography, hydrophobic interaction chromatography, affinity chromatography and mixed-mode chromatography.

In the method according to the present invention, it is possible to determine the concentration or concentrations of one or more compounds depending on the time t during the process and the location z of the chromatography device/the chromatography bed. In this context, the location z of the chromatography device is along the above-mentioned predetermined direction in which the mobile phase moves during the chromatography. In the context of the present invention, it can be assumed that the concentration of the at least one compound does not vary in the two other directions x and y perpendicular to the direction z.

The at least one compound selected in step (ia) is not particularly limited. For instance, it can be selected among small molecules (Mn≤8000 g/mol, determined by GPC based on polystyrene standards), drugs, proteins, nucleotides, nucleosides, biological cells, viruses, virus-like particles, antibody-drug conjugates, charge variance antibodies, antibody fragments, polyaminoacids and polypeptides. Preferably, the at least one compound comprises or is a protein and/or a drug.

The method of the present invention enables the calculation of the concentration of at least one compound in a chromatography process. It is in principle possible to determine the concentration of any compound present in the mobile phase at any predetermined location z of the chromatography device and at any time t during the chromatography. Preferably, the concentration of the at least one compound is calculated at the outlet of the chromatography device for a plurality of points in time.

It is possible that the concentration of only one compound is calculated. However, it is preferable that the concentrations of two or more compounds are calculated. It is particularly preferred to calculate the respective concentration of at least two different compounds, wherein at least one compound is a target compound and the one or more further compounds are impurity compounds. Thus, it is for instance possible to determine by the method of the present invention whether the chromatography parameters selected in steps (ia) to (id) enable a satisfactory separation of the one or more target compound(s) from the one or more impurity compound(s).

According to the present invention, a satisfactory separation between a target compound and an impurity compound means that at all times t during the chromatography only one of the target compound and the impurity compound has a significant concentration in the mobile phase at the outlet of the chromatography device. That is, the target compound and the impurity compound leave the chromatography device essentially at different times t. A significant concentration is a concentration of at least 0.01 μmol/L, preferably at least 0.001 μmol/L, particularly preferably at least 0.0001 μmol/L.

According to the present invention, step (ib) is not particularly limited. In principle, any stationary phase that is suitable for chromatography can be used. Suitable stationary phases are, for instance, porous and non-porous spherical particles, porous and non-porous non-spherical particles, for example silica particles, chromatography resins, chromatography membranes, chromatography monoliths, membrane adsorbers, wovens, non-wovens and mixed matrices. According to the present invention, a chromatography membrane (for example an ion-exchange chromatography membrane), a membrane adsorber, a monolith, non-porous spherical particles or non-spherical particles is/are preferably selected as the stationary phase in step (ib).

According to the present invention, it is preferred that the chromatography bed has an internal porosity $\varepsilon_p$ of at most 0.40, preferably at most 0.25, particularly preferably at most 0.10, even more preferably at most 0.05, most preferably 0.01, for example 0.00. When the internal porosity $\varepsilon_p$ is low, the maximum diffusion time $t_{diff}$ tends to be short so that the residence time $t_{res}$ can be reduced, which increases the efficiency of the chromatography method.

Speaking in terms of the stationary phase being constituted by a porous particulate material, the total porosity $\varepsilon_T$ of the chromatography bed can be divided into two terms:

Internal porosity/voidage $\varepsilon_p$: This term describes the internal voidage of the porous particles with respect to the total volume of the chromatography bed.

Bulk porosity/voidage $\varepsilon_b$: This term describes the voidage between the particles in the chromatography bed (flow channels) with respect to the total volume of the chromatography bed.

Both porosity values $\varepsilon_p$ and $\varepsilon_b$ can be added to yield the total porosity $\varepsilon_T$ of the chromatographic bed:

$$\varepsilon_T = \varepsilon_p + \varepsilon_b$$

The chromatography bed can be further characterized by the

Stationary phase porosity $\varepsilon_{sp}$: This term describes the internal voidage of a porous particle with respect to the total volume of the stationary phase.

$$\varepsilon_{sp} = \frac{\varepsilon_T - \varepsilon_b}{1 - \varepsilon_b} = \frac{\varepsilon_p}{1 - \varepsilon_b}$$

Not only stationary phases constituted by particulate materials can be described by the above parameters $\varepsilon_T$, $\varepsilon_p$, $\varepsilon_b$ and $\varepsilon_{sp}$ but also stationary phases in general, such as membranes, monoliths, non-wovens, wovens and other non-particular media. Depending on the structure of the stationary phase (matrix), the internal porosity $\varepsilon_p$ can equal zero, which leads to possible simplifications of the mass transport phenomena due to the absence of intra-matrix structure diffusion.

The values of the internal porosity $\varepsilon_p$, the stationary phase porosity $\varepsilon_{sp}$, the bulk porosity $\varepsilon_b$, and the total porosity $\varepsilon_T$ can be determined as explained in the following.

Inverse size exclusion chromatography (iSEC) is a widely used method to determine the voidage and porosity of chromatographic media in respect of the molecule size. A reference molecule (tracer molecule) for the inverse size exclusion chromatography has to be chosen. The size of the reference molecule should match the size of the at least one compound (e.g. a target molecule). It is preferred that the reference molecule does not interact with the stationary phase. Preferred molecule classes for the reference molecule, having a narrow and defined size distribution, are in particular but not limited to polysaccharides, polyacrylates, polystyrenes, polymethacrylates, polyacrylamides, latex beads. (Inverse size exclusion chromatography can additionally be used to calculate the pore size distribution using various models.)

A major analytical approach is represented by the conventional method of statistical moments. Applied to the chromatographic peaks resulting from a narrow rectangular pulse injection of the tracer into the system, this method is an effective approach to calculate the actual volume, voidage (porosity) and dispersion coefficient $D_{ax}$ of the chromatography bed.

Following the moment analysis technique, a voidage value, depending on buffer conditions and molecule size, can be calculated using the following approach:

$$\varepsilon = \frac{V}{F/\mu_p} \quad (1)$$

where ε represents the volume fraction accessible for the tracer molecule (reference molecule), V the chromatography bed volume, F the volumetric flow rate and $\mu_p$ the first moment of a tracer peak.

For all signals, the first ($\mu_p$) and second ($\sigma_p^2$) moments can be measured and calculated as proposed by H. W. Haynes (A Model for the Application of Gas Chromatography to measurements of Diffusion in Bidisperse Structured Catalysts, AIChE J. 19 (1973) 1043-1046. doi:10.1002/aic.690190526) and corrected, if necessary, by subtracting the moments attributed to the extra-column volume of the chromatography device (such as a HPLC system).

This correction procedure can be performed by determining the first ($\mu_{HPLC}$) and second ($\sigma_{HPLC}^2$) moment of a tracer signal measured in the absence of the chromatographic medium. The respective value is then subtracted from the first ($\mu_{p,obs}$) and second ($\sigma_{p,obs}^2$) moment determined in the presence of the chromatographic medium to eliminate the influence of the chromatographic system (see the below formulae (4) and (5)).

$$\mu_{p,obs} = \frac{\int_0^\infty C_{d,i}(t) \cdot t \cdot dt}{\int_0^\infty C_{d,i}(t) \cdot dt} \quad (2)$$

$$\sigma_{p,obs}^2 = \frac{\int_0^\infty C_{d,i}(t) \cdot (t - \mu_{p,obs})^2 \cdot dt}{\int_0^\infty C_{d,i}(t) \cdot dt} \quad (3)$$

$$\mu_p = \mu_{p,obs} - \mu_{HPLC} \quad (4)$$

$$\sigma_p^2 = \sigma_{p,obs}^2 - \sigma_{HPLC}^2 \quad (5)$$

where $\mu_p$ and $\sigma_p^2$ are the first and second moment of the tracer peak. $\mu_{p,obs}$ and $\sigma_{p,obs}^2$ are attributed to the whole system, whereas $\mu_{HPLC}$ and $\sigma_{HPLC}^2$ correspond only to the extra column volume. $C_{d,i}(t)$ represents the concentration of the tracer i at a detector at time t. That is, the concentration $C_{d,i}(t)$ is detected by the detector.

If the chromatography bed has no internal porosity, the bulk porosity $\varepsilon_b$ can be directly obtained with respect to the used molecule size by applying formulae (1), (2) and (4). In this case, $\varepsilon_b = \varepsilon = \varepsilon_T$, $\varepsilon_p = 0$ and $\varepsilon_{sp} = 0$.

If the chromatography bed has an internal porosity $\varepsilon_p$ and a stationary phase porosity $\varepsilon_{sp}$, the values of $\varepsilon_p$ and $\varepsilon_{sp}$ can be determined using the following approach:

Small tracer molecules can completely access the internal voidage $\varepsilon_p$, reflecting the stagnant phase, as well as the volume $\varepsilon_b$ in the larger transport channels, occupied by the mobile phase. The obtained boundary value for the accessible volume fraction reflects therefore the total voidage $\varepsilon_T$ of the chromatography bed. That is, in case a small molecule such as acetone is used as a tracer i, $\varepsilon = \varepsilon_T$ in formula (1). Large tracer molecules i are completely excluded from the internal voidage $\varepsilon_p$. The obtained boundary values for the accessible volume fraction reflects the external voidage (bulk porosity) $\varepsilon_b$, which is occupied by the mobile phase. That is, in case a large molecule such as dextran having a weight-average molecular weight $M_w$ determined by size exclusion chromatography of 2 000 000 g/mol is used as a tracer i, $\varepsilon = \varepsilon_b$ in formula (1). Both boundary values are necessary to describe the stationary phase porosity of the chromatography bed $\varepsilon_{sp}$:

$$\varepsilon_{sp} = \frac{\varepsilon_T - \varepsilon_b}{1 - \varepsilon_b}$$

The same approach can be used for the internal porosity $\varepsilon_p$. Both values for the external and the total porosity are necessary for its calculation ($\varepsilon_p = \varepsilon_T - \varepsilon_b$).

The determination of $\varepsilon_p$ and $\varepsilon_{sp}$ needs therefore one tracer molecule with no accessibility to the internal porosity (such as dextran) and another tracer molecule with complete accessibility to the internal porosity (such as acetone). A combination of formulae (1), (2) and (4) makes it possible to calculate the value of $\varepsilon_p$ or $\varepsilon_{sp}$ as described in detail in J. Schwellenbach, S. Zobel, F. Taft, L. Villain, J. Strube, Purification of monoclonal antibodies using a fiber based cation-exchange stationary phase: parameter determination and modeling, Bioengineering 3 (2016) 24/1-24/20. doi: 10.3390/bioengineering3040024.

In case it is unknown whether the internal porosity $\varepsilon_p$ of the chromatography bed is zero or not, the stationary phase is dealt with in accordance with the above method for determining the internal porosity $\varepsilon_p$. If $\varepsilon_p$ is zero, the experiments with the small and large tracer molecules will yield the same result for $\varepsilon$ in formula (1), i.e. $\varepsilon_b = \varepsilon_T$, and the resulting value for $\varepsilon_p$ according to the formula "$\varepsilon_p = \varepsilon_T - \varepsilon_b$" will be 0.

In case the stationary phase is constituted by a particulate material such as silica particles, the internal porosity $\varepsilon_p$ of the chromatography bed reflects the porosity within the particles. Contrary thereto, the bulk porosity $\varepsilon_b$ is constituted by the space between the particles without taking the internal porosity $\varepsilon_p$ into account. The total volume accessible by the mobile phase (total porosity $\varepsilon_T$) is the sum of the bulk and internal porosities ($\varepsilon_T = \varepsilon_p + \varepsilon_b$).

According to a preferred embodiment of the present invention, the stationary phase is a chromatography membrane (e.g. an ion-exchange chromatography membrane), a chromatography resin or a monolith, preferably a chromatography membrane or a monolith.

According to the present invention, any mobile phase that can be used in a chromatography method can be selected in step (ic). The mobile phase is preferably liquid. Moreover, the mobile phase can include or be an organic solvent or a mixture of organic solvents. In addition to one or more organic solvents, the mobile phase can include water. Preferably, the mobile phase is an aqueous medium. The composition of the mobile phase can vary during the chromatography method (gradient chromatography). For instance, when the mobile phase includes one or more organic solvents, the concentration of the one or more organic solvents may be changed during the chromatography. Moreover, when the mobile phase is an aqueous medium, the pH and/or the salt concentration of the mobile phase can vary during the chromatography method. For such cases (e.g. in case the pH and/or the salt concentration vary), the adsorption isotherm has to be obtained for various compositions of the mobile phase (i.e. varying pH and/or varying salt concentration) in step (iia).

According to the present invention, the pH of the mobile phase can in principle take any value. Preferably, the pH has a value of from 0 to 14, more preferably 2 to 12, particularly preferably 3 to 11, even more preferably 4 to 10, and most preferably 5 to 9. Of course, the pH may also be kept constant during the chromatography method.

According to the present invention, the salt concentration of the mobile phase can in principle take any value, as long as the solubility of the salt(s) in the mobile phase is not exceeded. Preferably, the salt concentration has a value ranging from 0 to 10 mol/L, more preferably 0 to 5 mol/L, particularly preferably between 0 to 3 mol/L, most preferably 0 to 1 mol/L. Of course, the salt concentration may also be kept constant during the chromatography method.

According to the present invention, one or more salts may be dissolved in the mobile phase, as mentioned above. The one or more salts are not particularly limited. Preferably, the one or more salts are selected from the group consisting of sodium chloride, potassium chloride, sodium sulfate, sodium carbonate, potassium sulfate, potassium dihydrogenphosphate, dipotassium hydrogenphosphate, ammonium sulfate, urea hydrochloride, guanidine hydrochloride, disodium hydrogenphosphate, sodium dihydrogenphosphate, tris(hydroxymethyl)aminomethane hydrochloride, glycine, trisodium citrate and combinations thereof. The mobile phase may alternatively or additionally contain the corresponding acids, such as hydrochloric acid, sulfuric acid, citric acid, etc.

The chromatography device selected in step (id) is not particularly limited. The chromatography device can have any size, from the laboratory scale, where the volume $V_b$ of the chromatography bed is at most 500 mL, preferably at most 100 mL, particularly preferably at most 20 mL, even more preferably at most 5 mL, to the industrial scale, where the volume $V_b$ of the chromatography bed is more than 500 mL, preferably at least 1 L, particularly preferably at least 5 L, even more preferably at least 10 L. Preferably, the volume $V_b$ is at least 0.01 mL, more preferably at least 0.1 mL, particularly preferably at least 0.5 mL. It is further preferred that the volume $V_b$ is at most 1000 L, more preferably at most 500 L. Preferably, the chromatography device has a volume $V_b$ of the chromatography bed of more than 500 mL.

Preferably, step (id) does not only include the selection of the chromatography device but also the selection of at least one tank, a liquid pump, a detector, a plurality of valves and a process control software (selection of chromatography set-up), without being limited thereto. The chromatography set-up may vary in its machinery and systems by the processing complexity. For instance, the tank can be omitted e.g. when the chromatography method is a continuous chromatography method. In the exemplary chromatographic set-up displayed in FIG. 13, the reciprocating pump P1 promotes the feed solution from the feed tank B1 to the chromatographic device, here a membrane adsorber MA1. The corresponding detector signal is detected preferably downstream of the chromatographic device MA1. Thereafter, the mobile phase is preferably collected in a tank B2 or further purified. Impurities are preferably directed to a waste collector (not displayed in FIG. 13).

According to the present invention, the chromatography temperature is not particularly restricted as long as it is possible to carry out the chromatography at the selected temperature. Preferably, the chromatography temperature is more than 0° C., more preferably at least 1° C., particularly preferably at least 5° C., even more preferably at least 15° C. The upper limit of the chromatography temperature is preferably less than 100° C., preferably 80° C. or less, more preferably 70° C. or less, particularly preferably 60° C. or less, even more preferably 50° C. or less. The chromatography temperature may be varied during the chromatography method, preferably within the above-specified ranges. Preferably, the chromatography temperature is constant.

In step (iia) of the inventive method, an adsorption isotherm of the at least one compound on the stationary phase is obtained. The adsorption isotherm is an equation that relates the binding capacity q to the concentration of the at least one compound in the mobile phase, i.e. an equation having the form q=f(c). According to the present invention, the binding capacity q(z,t) is understood as the proportion of the at least one compound that is adsorbed on the stationary phase instead of being located in the mobile phase and is expressed in mol/L, with respect to a certain time t and location z.

According to the present invention, the adsorption isotherm can be obtained experimentally, which is preferred. Thus, according to a preferred embodiment of the present invention, step (iia) of obtaining the adsorption isotherm involves one or more laboratory experiments. Preferably, equilibrium adsorption data are obtained by means of laboratory experiments. Specifically, batch experiments can be used, as they offer a low need for target molecule and can be automated. Other experiments based on uptake within a packed chromatography bed under dynamic conditions can also be used as the resulting equilibrium data is identical but higher amounts of target molecule are required.

A person skilled in the art is able to determine an adsorption isotherm based on his background knowledge. For instance, the adsorption isotherm obtained in step (iia) can be a steric-mass-action (SMA) adsorption isotherm, a Langmuir adsorption isotherm or a Freundlich adsorption isotherm.

According to a preferred embodiment of the present invention, an SMA isotherm can be used as the adsorption isotherm. The SMA isotherm can be used in order to describe the adsorption of the at least one compound in dependence on influencing factors like the salt concentration and/or pH. An SMA isotherm can be determined as described in detail in Brooks, Clayton A.; Cramer, Steven M. (1992): Steric mass-action ion exchange. Displacement profiles and induced salt gradients. In AIChE J. 38 (12), pp. 1969-1978. DOI: 10.1002/aic.690381212; and in Journal of Chromatography A, 1233 (2012) 54-65 "Determination of parameters for the steric mass action model—A comparison between two approaches". The SMA isotherm is preferred when the stationary phase is an ion-exchange chromatography membrane.

In the following three equations, the electro neutrality in dependency of the steric factor $\sigma_i$ of the at least one compound, characteristic charge $v_i$ of the at least one compound and binding capacity of counter ions $q_1$ ($q_1$ is the binding capacity of the salt) as well as the binding capacity $q_i$ of the at least one compound are shown. In the formulae, n is the number of the at least one compounds and $\Lambda$ is the ionic capacity of the chromatographic medium (stationary phase).

$$\Lambda = q_1 + \sum_{i=2}^{n+1}(v_i + \sigma_i)q_i$$

$$\Lambda = q_1 + \sum_{i=2}^{n+1} v_i \cdot q_i$$

$$q_i = q_1 - \sum_{i=2}^{n+1} \sigma_i \cdot q_i$$

The ionic capacity Λ of the chromatographic medium defines the number of ligands on the chromatographic backbone. The ionic capacity (or capacity of a chromatographic medium) Λ can be determined by means of a chemical reaction of the ligands on the backbone with a characteristic component which binds to each of the ligands or by means of titration. For ion exchange chromatography (IEX), the ionic capacity Λ is determined by titration of the charged ligands by the corresponding acid or base.

For a rapid equilibrium or in equilibrium state, the SMA isotherm can be written as in the following equation.

$$c_i = \frac{q_i}{k} \cdot \left( \frac{c_1}{\Lambda - \sum_{i=2}^{n+1}(v_i + \sigma_i) q_i} \right)^{v_i}$$

In the above equation, $c_1$ is the concentration of the at least one compound and $c_1$ is the salt concentration at the binding site.

The characteristic charge $v_i$ and the equilibrium constant k can be determined by the curve evaluation of the capacity factor log k' with the equation $$k' = \frac{1-\varepsilon_T}{\varepsilon_T} \cdot \left( \frac{q_i}{c_i} \right)$$

in the equation $$\log k' = \log\left( \frac{1-\varepsilon_T}{\varepsilon_T} \cdot k \cdot \Lambda^{v_i} \right) - v_i \cdot \log(c_1).$$

Using a linear regression of logarithmic capacity factor over logarithmic salt concentration results in the charge $v_i$ and equilibrium constant k by slope and intercept. The steric factor $\sigma_i$ can be fitted by error minimization on the experimental results or calculated with the following equations for $c_i \to \infty$; $q_1 \to 0$:

$$\lim_{c_i \to \infty} q_i = q_i^{max} = \frac{\Lambda}{\sigma_i + v_i}$$

According to another preferred embodiment of the present invention, a Langmuir isotherm can be obtained in step (iia).

A Langmuir isotherm can be written for multiple components (i.e. in case there the number of the at least one compound is 2 or more) in the following form $$q_i = \frac{K_{eq,i} \cdot q_{max,i} \cdot c_i}{1 + \sum_{j=1}^{n} K_{eq,j} \cdot c_j}$$

where $q_i$ represents the binding capacity for compound i, $K_{eq,i}$ is the equilibrium adsorption constant, $q_{max,i}$ is the maximum binding capacity of the chromatographic medium and $c_i$ is the concentration of compound i in the mobile phase. Moreover, the sum $\sum_{j=1}^{n} K_{eq,i} \cdot c_j$ includes all components present in the mobile phase that are able to adsorb to the stationary phase, including compound i.

Following the work published by Yamamoto et al. (Biotechnology and Bioengineering, Vol XXV, Pp. 1465-1583 (1983)) and Forrer (Nicola Forrer, "Antibody purification with ion-exchange chromatography", dissertation, ETH Zurich 2008), the Langmuir parameters, namely the maximum binding capacity $q_{max,i}$ and the equilibrium binding constant $K_{eq,i}$, can be related to the salt concentration or pH within the fluid phase to describe the salt/pH dependent binding behavior. In the following equations, the salt concentration or the pH are expressed by $c_{mod}$.

$$q_{max,i} = a_1 \cdot c_{mod} + a_2$$

$$K_{eq,i} = b_1 \cdot \exp(-b_2 \cdot c_{mod})$$

The parameters $a_1$, $a_2$, $b_1$ and $b_2$ are coefficients used to describe the salt dependency of the isotherm parameters $K_{eq,i}$ and $q_{max,i}$. If the isotherm parameters have been acquired for different salt concentrations, the coefficients can be determined by a least-square fit of the above shown functions to the salt dependent isotherm parameter data sets.

In case one or more of the conditions selected from the group consisting of the chromatography temperature, the pH of the mobile phase and the salt concentration of the mobile phase varies, several adsorption isotherms need to be obtained for each of the varying condition(s) in step (iia) so as to cover the whole range of chromatography temperatures, the whole range of the pH of the mobile phase and/or the whole range of the salt concentration of the mobile phase. In such a case, the adsorption isotherms for only some of the varying conditions can be obtained according to the present invention, while the adsorption isotherms for the other conditions can be obtained by means of interpolation using a functional relation, which describes the obtained data sets. A similar approach as described for the salt-dependency of the isotherm parameters can be used for the temperature or pH dependency.

In step (iib) of the inventive method, the maximum diffusion time $t_{diff}$ of the at least one compound in the mobile phase is obtained. The maximum diffusion time $t_{diff}$ describes the maximum time needed for a target molecule in the center of a pore or of a transport channel of the stationary phase to reach a binding site by diffusion.

The maximum diffusion time $t_{diff}$ can be determined as described in the following.

In general, the time needed for the at least one compound to reach a binding site of the stationary phase in a given distance can be approximated using the mean squared displacement (MSD) $x(t)^2$. It is a measure of the deviation of the position of a particle with respect to a reference position over time. It is the most common measure of the spatial extent of random motion, and can be thought of as measuring the portion of the system "explored" by the random walker. For a one-dimensional case, the MSD can be calculated as given in the following formula.

$$x(t)^2 = 2 D_{eff} t_{diff}$$

Thus, according to a preferred embodiment of the method according to the present invention, the maximum diffusion time is determined by the following equation $$t_{diff} = \frac{x(t)^2}{2 D_{eff}}$$

The values to calculate the maximum diffusion time are therefore:

The effective diffusion coefficient $D_{eff}$.

The maximum diffusion path length x(t) for a target molecule to reach a binding site.

The maximum diffusion path length x(t) is given by the geometry or the chemical modification of the used stationary phase. As an example, the respective values are given for two prominent chromatographic media:

| Stationary phase | Maximum diffusion path length | Method of determination |
|---|---|---|
| Chromatographic resin | Particle radius 25-50 μm | Confocal Laser Scanning Microscopy |
| Membrane adsorber | Pore radius 3-5 μm | Scanning Electron Microscopy |

Both methods, Scanning Electron Microscopy and Confocal Laser Scanning Microscopy, are imaging procedures. The obtained images can be used to measure the dimensions of flow channels or particles size or a combination of both. These dimensions are the maximum pathways for a target molecule that need to be travelled before reaching a binding site and therefore reflect the maximum diffusion path length. This method can be used for all stationary phases having diffusion dimensions that can be resolved using the above mentioned techniques.

Scanning Electron Microscopy (SEM) can also be used for maximum diffusion path lengths in the range of more than 5 μm to less than 25 μm.

As a further alternative, the effective diffusion coefficient $D_{eff}$ can be calculated based on correlations if the bulk diffusion coefficient of the target molecule is known. The bulk diffusion coefficients of many molecules like globular proteins or viruses are published in the literature or can be estimated (for instance see Biotechnology and Bioengineering, Vol. XXII, Pp. 647-955 (1980)).

As a further alternative, the Einstein-Stokes equation can be used to estimate the bulk diffusion coefficient $D_{bulk}$ based on the molecule radius r, the dynamic viscosity of the solvent η, the temperature T and the Boltzmann constant $k_B$:

$$D_{bulk} = \frac{k_B T}{6 \pi \eta r}$$

Under defined conditions, the molecule radius r can be determined using dynamic light scattering. This method relies on the intensity fluctuation of scattered light caused by molecular motions in solution. This method also offers a direct access to the diffusion coefficient.

The solution viscosity η can be determined using a falling-sphere viscosimeter. Stokes' law is the basis of the falling-sphere viscometer, in which the fluid is stationary in a vertical glass tube. A sphere of known size and density is allowed to descend through the liquid. If correctly selected, it reaches terminal velocity, which can be measured by the time it takes to pass two marks on the tube. Electronic sensing can be used for opaque fluids. Knowing the terminal velocity, the size and density of the sphere, and the density of the liquid, Stokes' law can be used to calculate the viscosity of the fluid.

The effective diffusion coefficient $D_{eff}$ is often by an order of magnitude lower in a porous system like a chromatographic resin or the hydrogel layer of a membrane adsorber due to the movement in a constricted pore system. This can be summarized as the tortuosity factor τ.

$$D_{eff} = \frac{D_{bulk}}{\tau}$$

Thus, based on the bulk diffusion coefficient $D_{bulk}$ and the tortuosity factor r, the effective diffusion constant $D_{eff}$ can be calculated.

Following the correlation published by Mackie and Meares (J. S. Mackie, P. Meares, The Diffusion of Electrolytes in a Cation-Exchange Resin Membrane. I. Theoretical, Proc. R. Soc. London. Ser. A. Math. Phys. Sci. 232 (1955) 498-509. http://rspa.royalsocietypublishing.org/content/232/1191/498.abstract.), the tortuosity factor can be calculated using the stationary phase porosity $\varepsilon_{sp}$:

$$\tau = \frac{(2 - \varepsilon_{sp})^2}{\varepsilon_{sp}^2}$$

The stationary phase porosity $\varepsilon_{sp}$ can be determined as described above.

According to step (iii) of the method of the present invention, the minimum residence time $t_{res}$ of the at least one compound in the chromatography bed is selected such that Equation I is satisfied.

$$t_{res} > t_{diff} \quad \text{Equation I:}$$

Since $t_{res} > t_{diff}$, the diffusion of the at least one compound can be disregarded in step (iv) without substantially compromising the accuracy of the method.

The minimum residence time of the at least one compound can be calculated using the volumetric flow rate F, the volume of the chromatography bed defined by its geometric dimensions $V_b$ and the total porosity $\varepsilon_T$.

$$t_{res} = \frac{V_b \, \varepsilon_T}{F}$$

According to a preferred embodiment of the present invention, the minimum residence time $t_{res}$ of the compound in the chromatography bed is selected such $t_{res}$ that Equation 1-1 is satisfied.

$$t_{res} > 2 \cdot t_{diff} \quad \text{Equation I-1:}$$

According to Equation I-1, $t_{res}$ is larger than two times $t_{diff}$. Preferably, $t_{res} > 3 \cdot t_{diff}$, $t_{res} > 5 \cdot t_{diff}$, more preferably $t_{res} > 10 \cdot t_{diff}$, particularly preferably $t_{res} > 100 \cdot t_{diff}$. The higher the ratio of $t_{res}$ to $t_{diff}$ s, the more accurate the concentration c(z,t) can be calculated in step (iv).

The value of $t_{res}$ is not limited according to the present invention. By selecting appropriate chromatography parameters, Equation I can be satisfied even if the residence time $t_{res}$ is short. Nevertheless, it is preferred that the residence time $t_{res}$ is at least 0.1 seconds, more preferably at least 2.5 seconds, even more preferably at least 5.0 seconds, particularly preferably at least 7.5 seconds.

By increasing the value of $t_{res}$, the ratio of $t_{res}$ to $t_{diff}$ is increased, which improves the accuracy of the method according to the present invention. However, when the residence time is too high, the chromatography process may become too time consuming and thus uneconomical. Therefore, it is preferred that $t_{res}$ is at most 20.0 seconds, more preferably at most 17.5 seconds, particularly preferably at most 15 seconds.

According to a preferred embodiment of the present invention, step (iv) is carried out without taking the rate of the adsorption of the at least one compound to the stationary phase and the rate of the desorption of the at least one compound from the stationary phase into account. According to this preferred embodiment, adsorption kinetics are disregarded.

In case $t_{diff}$ is very low because the pore or particle radius of the material constituting the stationary phase is very small, the adsorption kinetics can become the rate limiting step. Thus, it is preferred according to the present invention that $t_{res} > t_{ads}$, more preferred $t_{res} > 2\ t_{ads}$ and even more preferred $t_{res} > 3\ t_{ads}$, in particular for the case that $t_{diff} < t_{ads}$, where $t_{ads}$ represents the characteristic adsorption time. However, the half-life of the adsorption reaction is commonly two orders of magnitude lower of the bed residence time, if volumetric flow rates of up to 20 column volumes per minute are maintained. Therefore, the adsorption kinetics can usually be disregarded without rendering the result in step (iv) inaccurate.

According to a preferred embodiment of the present invention, in step (iv), c(z, t) is calculated based on the following equation $$\frac{\partial c(z,\ t)}{\partial t} = Z$$

wherein Z is a sum including the following terms $$-\frac{(1-\varepsilon_b)}{\varepsilon_b} \cdot \frac{\partial q(z,\ t)}{\partial t}$$

and $$-v\frac{\partial c(z,\ t)}{\partial z}$$

wherein
q(z, t) represents the binding capacity of the at least one compound by the stationary phase,
$\varepsilon_b$ is the bulk porosity of the chromatography bed, and
v is the velocity of the mobile phase (m/s) in the chromatography bed.

The value of v can be calculated based on the following equation $$v = \frac{F}{A \cdot \varepsilon_b}$$

where F is the volumetric flow rate of the mobile phase (which is predetermined) and A is the cross-section area of the chromatography device selected in step (id). The value of A can be determined by a straightforward geometric calculation.

A person skilled in the art is able to calculate c(z, t) based on the equation $$\frac{\partial c(z,\ t)}{\partial t} = Z$$

by relying on his background knowledge. Preferably, calculating c(z, t) based on the equation $$\frac{\partial c(z,\ t)}{\partial t} = Z$$

is carried out try using a computer, particularly preferably by a computer-based numerical method.

Preferably, the sum Z further includes the term $$+D_{ax}\frac{\partial^2 c(z,\ t)}{\partial z^2}$$

wherein $D_x$ is the axial dispersion coefficient of the at least one compound in the chromatography bed.

The axial dispersion coefficient $D_{ax}$ of the at least one compound in the chromatography bed can be calculated based on the following equation $$D_{ax} = \alpha \cdot v$$

where $\alpha$ is a dispersivity factor. This factor can be determined by measuring the axial dispersion coefficient at different linear flow velocities via a linear regression as shown in Example 5. In a similar manner, the axial dispersion coefficient $D_{ax,DPF}$ of the at least one compound in the hypothetical DPF as described below can be calculated using the equation $D_{ax,DPF} = \alpha_{DPF} \cdot v$.

Alternatively, the axial dispersion coefficient $D_{ax}$ can be calculated from the following equation.

$$D_{ax} = \frac{vL}{Bo}$$

In the above equation, Bo is the Bodenstein number, v is the linear velocity and L is a characteristical length. The Bodenstein number is determined by a pulse tracer experiment in which the axial dispersion coefficient is either fitted to the experimental data with error minimization or using the moment analysis. The characteristical length is the chromatography bed height (see Octave Levenspiel; Traxer Technology Modeling of the Flow of Fluids ISBN: 978-1-4419-8073-1).

As an alternative, the axial dispersion coefficient $D_{ax}$ can be calculated from the following equations.

$$D_{ax} = HETP \cdot \frac{v}{2 \cdot \varepsilon_b}$$

$$HETP = \frac{\sigma^2}{L} \frac{v}{\varepsilon_b}$$

In the above equations, HETP is the Height Equivalent to one Theoretical Plate and v is as defined above. HETP can be determined by tracer experiments in which the variance a of the corresponding peak, at a given linear velocity v and characteristic length L (chromatography bed height) is used.

In numerous cases, a chromatography device does not only contain the stationary phase/chromatography bed. Ancillary elements, like valves, tubings, flow distributors, etc. may be present. These ancillary elements, i.e. parts of the chromatography device through which the mobile phase flows and which are different from the chromatography bed are referred to as "external system". The influences of these ancillary elements on the hydrodynamic properties of the chromatography device can be taken account of as described in the following.

According to a preferred embodiment of the present invention, in step (iv), the chromatography device can be treated as a combination of a hypothetical stirred tank (ST), a hypothetical distributed plug flow pipe (DPF or PFP) and the chromatography bed, wherein the DPF is arranged downstream of the ST and the chromatography bed is arranged downstream of the DPF, as displayed in FIG. 1. (Alternatively, the chromatography device can be treated as a combination of only one of a hypothetical stirred tank (ST) and a hypothetical distributed plug flow pipe (DPF or PFP) with the chromatography bed.) Thus, the external system is preferably treated as a series of an ST and a DPF (external system "ST+DPF"). That is, according to a preferred embodiment of the present invention, $c(z, t)$ is calculated based on the following equations:

$$\frac{\partial c_{out}^{ST}}{\partial t} = \frac{F}{V_{ST}}(c_{in}^{ST} - c_{out}^{ST})$$

$$\frac{\partial c^{DPF}(z^{DPF}, t)}{\partial t} = -v\frac{\partial c^{DPF}(z^{DPF}, t)}{\partial z^{DPF}} + D_{ax}^{DPF}\frac{\partial^2 c^{DPF}(z^{DPF}, t)}{\partial (z^{DPF})^2}$$

$$\frac{\partial c(z, t)}{\partial t} = -\frac{(1-\varepsilon_b)}{\varepsilon_b} \cdot \frac{\partial q(z, t)}{\partial t} - v\frac{\partial c(z, t)}{\partial z} + D_{ax}\frac{\partial^2 c(z, t)}{\partial z^2}$$

wherein $V_{SYS} = V_{ST} + V_{DPF}$ $c(t = 0, z) = 0$ $c_{out}^{ST} = c^{DPF}(z^{DPF} = 0, t) = c_{in}^{DPF}(t)$ $c^{DPF}(z^{DPF} = z_{max}^{DPF}, t) = c_{out}^{DPF} = c(z = 0, t)$ In the above equations, $z^{DPF}$ is the location in the (hypothetical) DPF, $z_{max}^{DPF}$ is the maximum value that $z^{DPF}$ can take (outlet of the DPF), z is the location in the chromatography bed, $c_{in}^{ST}$ is the concentration of the at least one compound at the inlet of the (hypothetical) ST, $c_{out}^{ST}$ is the concentration of the at least one compound at the outlet of the ST, $V_{ST}$ is the volume of the ST, F is the volumetric flow rate of the mobile phase through the ST, $C^{DPF}$ is the concentration of the at least one compound in the DPF, $c_{in}^{DPF}$ is the concentration of the at least one compound at the inlet of the DPF, $c_{out}^{DPF}$ is the concentration of the at least one compound at the outlet of the DPF, $c(z=0, t)$ is the concentration of the at least one compound at the inlet of the chromatography bed, $D_{ax}^{DPF}$ is the axial dispersion coefficient of the DPF, which can be determined in a similar manner as the dispersion coefficient of the chromatography bed $D_{ax}$, $V_{SYS}$ is the total volume of the chromatography device which is accessible to the mobile phase except for the volume of the chromatography bed $V_b$, $V_{ST}$ is the volume of the stirred tank, and $V_{DPF}$ is the volume of the DPF. The further expressions are as defined above.

According to this preferred embodiment, the contribution of the external system is condensed in front of the column, meaning that the exit of the hypothetical stirred tank equals the inlet of the hypothetical DPF/PFP, and the exit of the DPF/PFP equals the inlet of the chromatography bed (see FIG. 1).

$V_{SYS}$ can be determined based on the geometry of the chromatographic apparatus. Specifically, $V_{SYS}$ can be determined in the absence of the chromatographic medium by applying an analysis of the first moment of a tracer signal.

$V_{SYS} = F\mu_p$ where F represents the volumetric flow rate and $\mu_p$ the first moment of a tracer peak, as already mentioned above. A regression of the complete concentration profile of a tracer substance leaving the system after a pulse injection leads to the complete parameter sets necessary to describe the fluid dynamic behavior of the external system. If a combination of ST and DPF is used to describe the behavior, an error minimization fitting procedure leads to $D_{ax}^{DPF}$, $V_{ST}$ and $V_{DPF}$.

In step (iv) of the method according to the present invention, a concentration $c(z, t)$ of the at least one compound in the mobile phase is calculated at a predetermined location z of the chromatography device and at a predetermined time t based on the adsorption isotherm of the at least one compound on the stationary phase. The skilled person can, based on the adsorption isotherm, carry out this step (iv) based on his background knowledge.

As noted above, the calculation of $c(z, t)$ in step (iv) may be based on partial differential equations (PDE, depending on time and space). To solve these equations, the PDEs can be transformed into ordinary differential equations (ODE). This is commonly done by describing the space dependency by a numerical method. One PDE is then transformed into n ODEs, where n is the degree of discretization. The numerical method used can be (but is not limited to) a finite difference method, orthogonal collocation or orthogonal collocation on finite elements.

In most cases, the resulting system of n ODEs cannot be solved analytically. A state of the art approach is the numerical integration at discrete time steps. Various different integration methods exist and can be used depending on the requirements. These are, but not limited to, implicit Euler method, explicit Euler method, variable step implicit Euler method and Runge-Kutta method.

Various commercial software bundles offer the possibility to solve the above PDE systems on which the calculation of $c(z, t)$ in step (iv) may be based. These include Aspen Custom Modeler®, MatLab®, ChromX®, CADET®, GE PROMPS®.

In a further aspect, the present invention relates to a method of obtaining at least one chromatography method parameter, selected from the group consisting of stationary phase, mobile phase and chromatography device, comprising the steps of (I) executing the method of determining the concentration of at least one compound in a chromatography method of the present invention for n times, wherein n is an integer of 2 or more, wherein the n executions differ from one another with respect to at least one of the steps (ib) to (id); and (II) selecting at least one stationary phase, at least one mobile phase, and/or at least one chromatography device based on the result of step (I).

Step (II) can be carried out by a human operator. Alternatively, step (II) can be automated, for instance by using a computer.

The complete description of a chromatographic process (e.g. a separation problem) by a mechanistic model is very beneficial with respect to parameter optimization and scale-up. The process window, which can be predicted, is directly correlated to the determined parameter space. Without the need for time and material consuming experimental effort on the pilot scale, optimized process parameters regarding the production scale can be directly predicted. Additionally, by using optimized process parameter sets, the overall process efficiency can be improved. With respect to the approach disclosed herein, the experimental effort for parameter determination on the lab scale is also significantly reduced. Based on a characterization of the chromatographic medium used, the validity of the disclosed approach can be confirmed and executed.

According to a preferred embodiment of the present invention, step (I) is carried out such that in each of the n executions, at least two different compounds are selected in step (ia) and in each of the n executions the at least two different compounds are the same. By this preferred embodiment, it is possible to find, among a set of chromatography method parameters, the best parameters for separating several compounds from one another.

In a further aspect, the present invention relates to a chromatography method comprising the above method of determining the concentration of at least one compound in a chromatography method, and (v) a step of carrying out the chromatography.

By using the above method, the concentration c(z,t) can be reliably predicted so that the chromatography method can be controlled or adapted in accordance with the result for c(z,t) obtained in step (iv).

According to a preferred embodiment of the present invention, step (iv) includes calculating the concentration of the compound in the mobile phase at the outlet of the chromatography device $c_{out}(t)$ at several points in time t and step (v) includes collecting the mobile phase at a time t where $c_{out}(t)>0.0$ mmol/L, preferably where $c_{out}(t)>0.00$ mmol/L. According to the present invention, the breakthrough curve of the at least one compound can be calculated in step (iv) and the mobile phase can be collected in accordance with the calculated breakthrough curve. It is particularly preferred that the mobile phase is collected at a time t where $c_{out}(t)$ is a significant concentration, i.e. a concentration of at least 0.01 μmol/L, preferably at least 0.001 μmol/L, particularly preferably at least 0.0001 μmol/L.

In a further aspect, the present invention relates to a chromatography method comprising the above method of obtaining at least one chromatography method parameter, and (III) a step of carrying out the chromatography based on the at least one chromatography parameter selected in step (II).

The present invention provides a process for rapidly, accurately and reliably calculating the concentration of at least one compound in a chromatography method. The inventive method can be used as a shortcut for obtaining optimized chromatography parameters. This can be particularly helpful in the scale-up of a chromatography process from the laboratory frame to the industrial scale.

In conventional scale-up methods, extensive data has to be acquired at a plurality of intermediate scale-up steps. Contrary thereto, a scale-up to the industrial scale is possible in a much easier way when using the method according to the present invention. Moreover, product loss can be minimized during a chromatography method with a reduced experimental effort to acquire the needed model parameters, compared to the state-of-the-art approach.

FIG. 3 shows the isotherm determination workflow of Example 2.

FIG. 4 shows equilibrium adsorption data for bovine serum albumin on Sartobind® Q of Example 2.

FIG. 5 shows a size exclusion chromatogram for a cell culture supernatant fraction eluted from Sartobind® S after equilibration of 8 hours of Example 2a.

FIG. 11 shows the comparison of the calculated breakthrough curve (dashed line) with the experimentally determined breakthrough curve (solid line) of Example 5.

FIG. 12 (a) shows equilibrium adsorption data including a Langmuir isotherm fit of Example 6.

FIG. 12 (b) shows the dependence of the equilibrium binding constant on the salt concentration of Example 6.

FIG. 12 (c) shows the dependence of the maximum adsorbent capacity on the salt concentration of Example 6.

Figure 14:
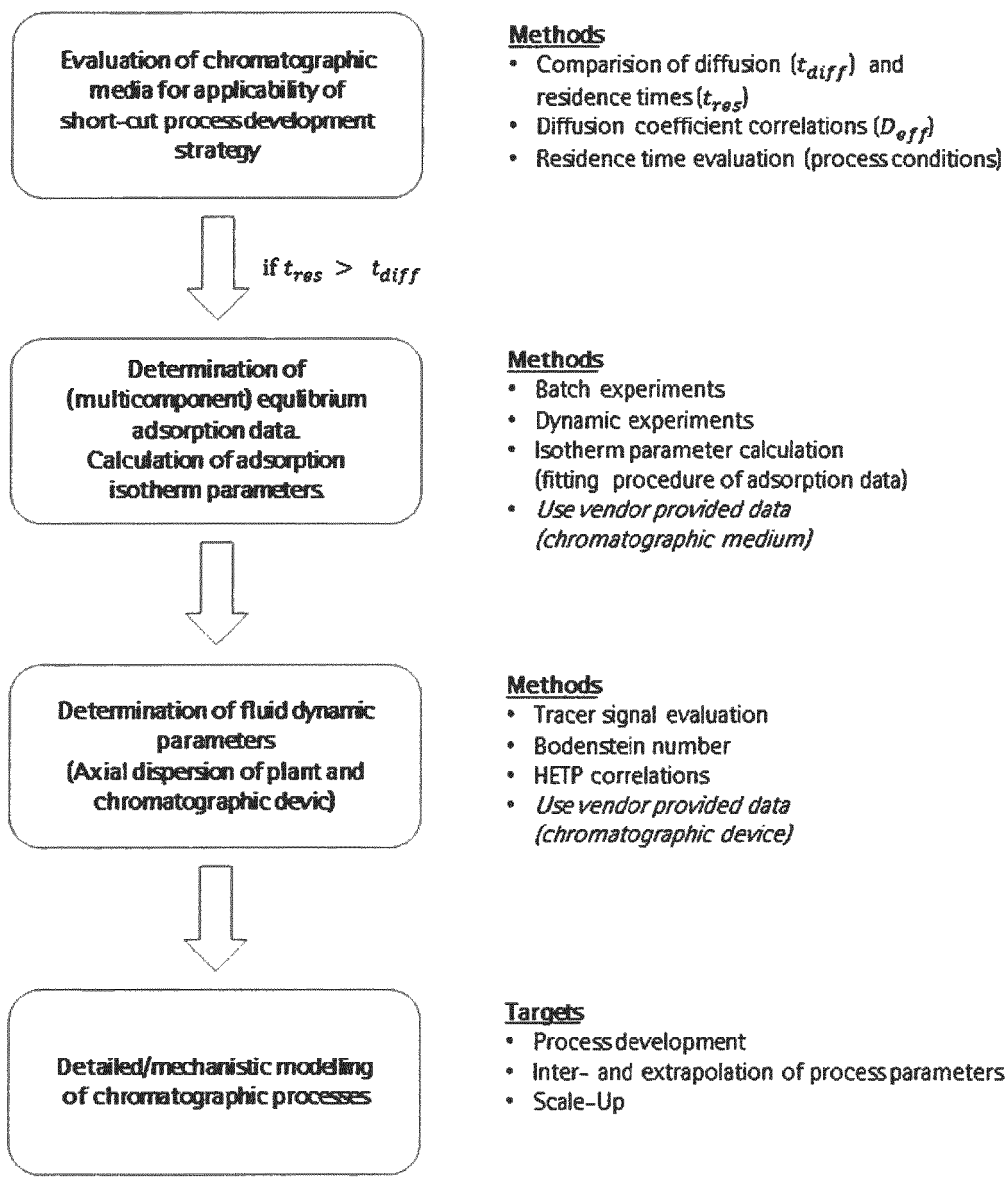

FIG. 14 schematically shows a preferred embodiment of the present invention.

The present invention is further illustrated by means of the following non-limiting Examples.

EXAMPLES

Example 1: Steps (iib) and (iii)

In the following, a reference calculation is shown comparing a membrane adsorber (Sartobind® S) with a common chromatographic resin (Fractogel EMD S03 (M)) under certain conditions.

Parameter Sets

| Target molecule: IVIG (human γ-Globulin, SeraCare) | |
|---|---|
| Bulk diffusion coefficient/(m²/s) | $4.00 \cdot 10^{-11}$ |
| Internal porosity (Sartobind ® S) | 0.40 |
| Internal porosity (Fractogel EMD $SO_3^-$ (M)) | 0.39 |
| Effective diffusion coefficient (Sartobind ® S)/(m²/s) | $2.49 \cdot 10^{-12}$ |
| Effective diffusion coefficient (Fractogel EMD $SO_3^-$ (M))/(m²/s) | $2.35 \cdot 10^{-12}$ |

The bulk diffusion coefficient was calculated using the Einstein-Stokes equation. In particular, intravenous immunoglobulin (IVIG; r=5.2 nm) was dissolved in an aqueous sodium phosphate buffer (20 mM, pH=7) having a viscosity η of 1,05 mPa s at a temperature of 298 K.

The porosity values were determined using inverse size exclusion chromatography (iSEC). Briefly, the chromatographic bed was equilibrated for 50 column volumes (CVs) of the desired buffer (sodium phosphate buffer (20 mM, pH=7)) before being loaded with injections (100 μL) of a solution containing pullulan molecules (2 mg/mL) with a narrow molecular weight distribution. The mean molecular weight, directly linked to the mean hydrodynamic radius of the applied pullulan samples, was varied for every injection covering a wide range (Mn=320-740,000 g/moL). The elution profile was recorded and analyzed by an RI detector.

The effective diffusion coefficients were calculated using the following correlations.

$$D_{eff} = \frac{D_{bulk}}{\tau}$$

$$\tau = \frac{(2-\varepsilon_{sp})^2}{\varepsilon_{sp}^2}$$

The values of the internal porosity $\varepsilon_p$ were determined by iSEC as described above.

| Stationary phase | |
| --- | --- |
| Stationary phase | Maximum diffusion path length |
| Sartobind ® S | 2.5 μm |
| Fractogel EMD SO$_3^-$ (M) | 27 μm |

The diffusion path lengths were determined by scanning electron microscopy. In particular, scanning electron microscopy (SEM, FEI Quanta 200F) was used to investigate the surface morphology of the chromatographic media. The samples were coated with gold prior to investigation. The images were obtained using an acceleration voltage between 2-20 kV and a spot-size of 1.0-8.0 in a high vacuum. Secondary electrons were detected using an Everhart-Thornley Detector. The resulting images were used to measure the pore (Sartobind® S) and particle radius (Fractogel EMD SO$_3^-$(M)). These values reflect the maximum diffusion path length.

These values lead to the following characteristic maximum diffusion times.

| Stationary phase | Maximum diffusion time $t_{diff}$ [s] |
| --- | --- |
| Sartobind ® S | 1.5 |
| Fractogel EMD SO$_3^-$ (M) | 152 |

A volumetric flowrate of 5 column volumes per minute (corresponding to a bed residence time $t_{res}$ of 12 s) is appropriate for Sartobind® S as $t_{res}$>3 $t_{diff}$. However, a residence time $t_{res}$ of 12 seconds is too short for Fractogel EMD SO$_3^-$ (M) as $t_{res}$<<$t_{diff}$. For Fractogel EMD SO$_3^-$(M) the dynamic binding capacity increases significantly with higher bed residence times.

Figure 1:
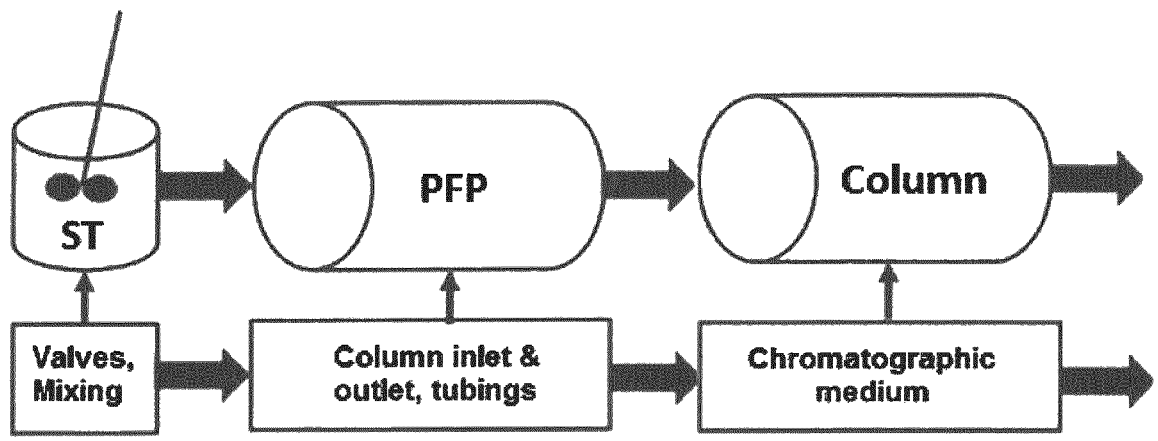
FIG. 1 shows a schematization of a chromatography device in accordance with a preferred embodiment of the present invention.
Figure 2:
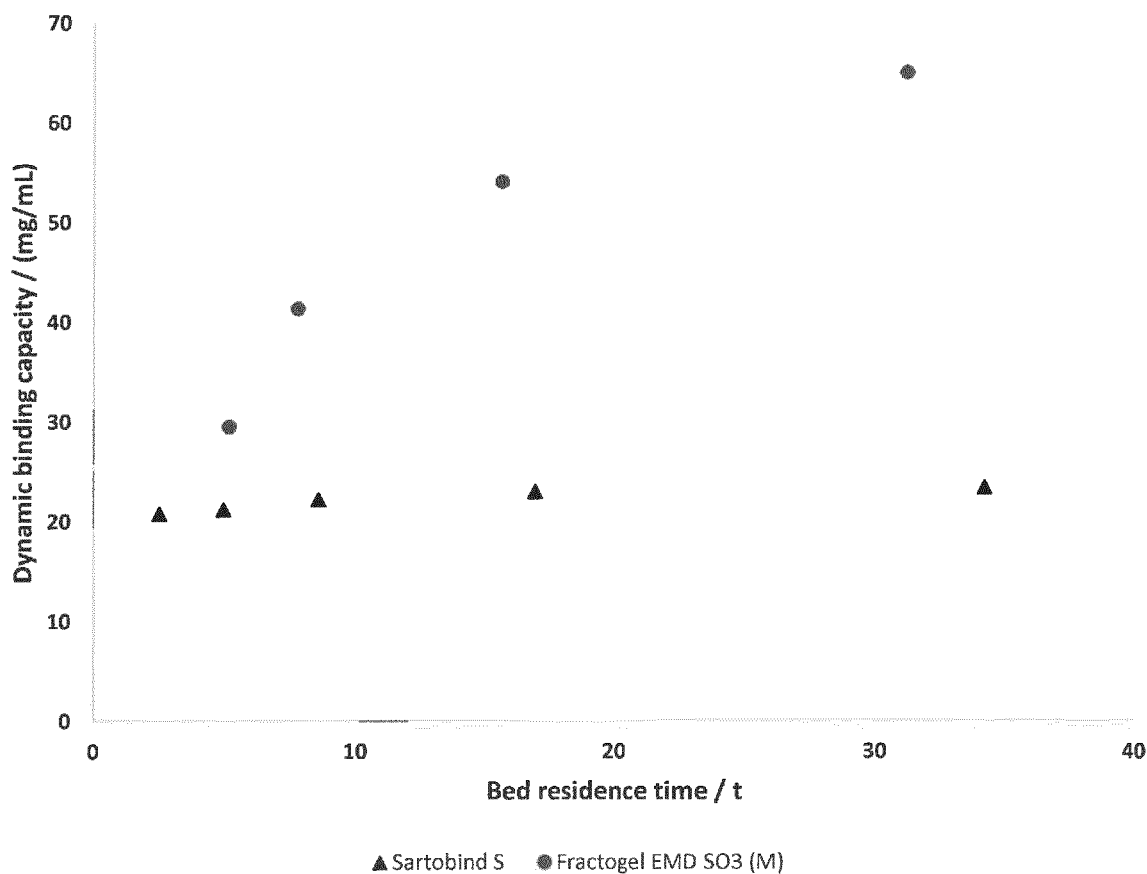
FIG. 2 shows the experimentally determined dynamic binding capacity for Sartobind® S and Fractogel EMD $SO_3^-$ (M) for different bed residence times of Example 1.

For demonstration, the dynamic binding capacity for IVIG using both stationary phases has been recorded using different bed residence times. The bed volume for both media was 1 mL. The result is shown in FIG. 2.

It can be seen that for Sartobind® S the mass-transport is not limited by diffusion in the investigated range of the bed residence time $t_{res}$ as the dynamic binding capacity is nearly unchanged with respect to the bed residence time $t_{res}$.

Example 2: Acquiring Equilibrium Adsorption Data (Step (iia))

In Example 2, equilibrium adsorption data for bovine serum albumin (BSA) on Sartobind® Q was obtained.

Determination of equilibrium adsorption data based on batch experiments as shown in Antibodies 2018, 7(1), 13 ("Evaluation of Continuous Membrane Chromatography Concepts with an Enhanced Process Simulation Approach", Steffen Zobel, Dominik Stein, Jochen Strube) for Sartobind® Q, mean pore diameter of 3 μm and a ligand density of $$2\text{-}5\frac{\mu eq}{cm^2},$$

was carried out with 0.1-5 g/L Bovine serum albumin (BSA). The used buffer was 20 mM TRIS HCl buffer, at pH=7, with NaCl concentrations of 0 to 0.3 M NaCl. The pH-value was adjusted using HCl or NaOH. The round Sartobind® Q membrane adsorber (MA) sample with a diameter of 20 cm and a height of 0.024-0.028 cm was equilibrated 30 min in 20 mM TRIS HCl buffer with the respective pH and salt concentration. The volume of the buffer was 200 times the volume of the MA. After an equilibration time of 30 minutes, the MA was dabbed with paper and transferred in a 12 well plate cavity. The BSA was dissolved in TRIS HCl buffer corresponding to the experiment pH and salt concentration. The concentration of the BSA feed solution was measured by UV/Vis spectroscopy at 280 nm and added with 4 mL to the MA in the 12 well plate. After a residence time of at least 8 h the supernatant concentration was measured, the MA was again paper dabbed and transferred in a new well plate. Subsequently, the MA was eluted with 4 mL 20 mM TRIS HCl and 1 M NaCl for at least 4 h. The supernatant concentration was measured after the 4 h elution time. The foregoing process is schematically depicted in FIG. 3.

The obtained data sets for three different salt concentrations are shown in FIG. 4.

Example 2a: Acquiring Adsorption Data for Several Compounds

The method of Example 2 is also viable for multicomponent analysis. A prominent example is the simultaneous determination of equilibrium adsorption data for monoclonal antibodies (mAb) as well as their aggregates and contaminants. The batch experiments can be carried out in the same way but the supernatant and the elution has to be analyzed in a way that allows distinguishing between all components (mAb monomer, aggregates and further contaminants). For example, this can be achieved by size exclusion chromatography.

Figure 5:
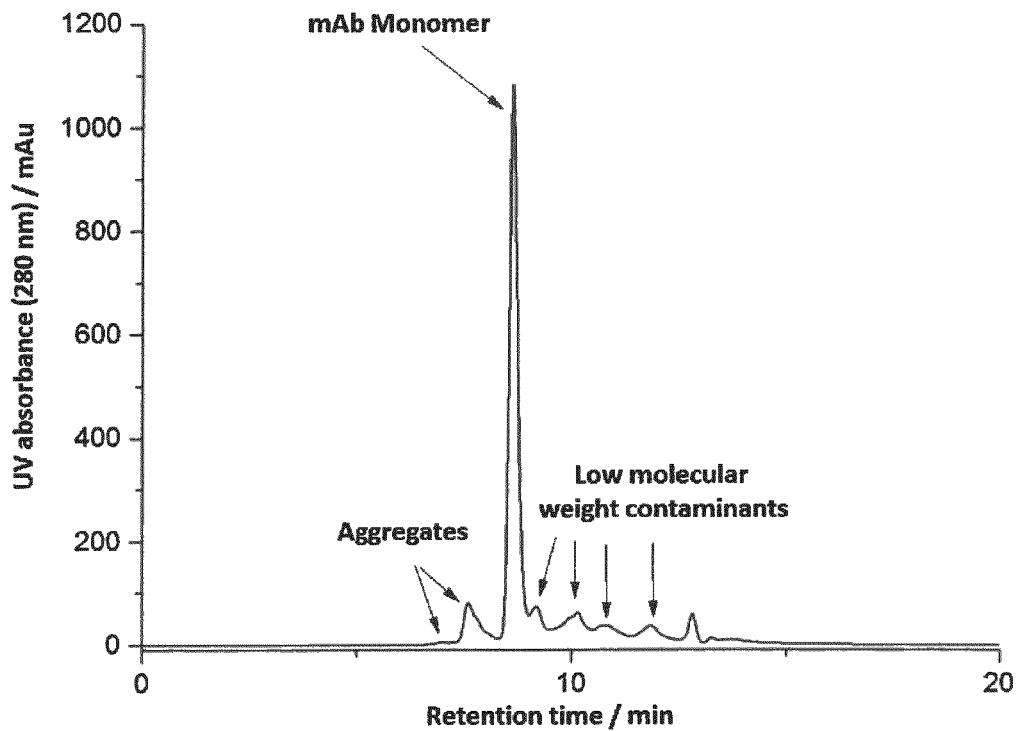
Figure 6:
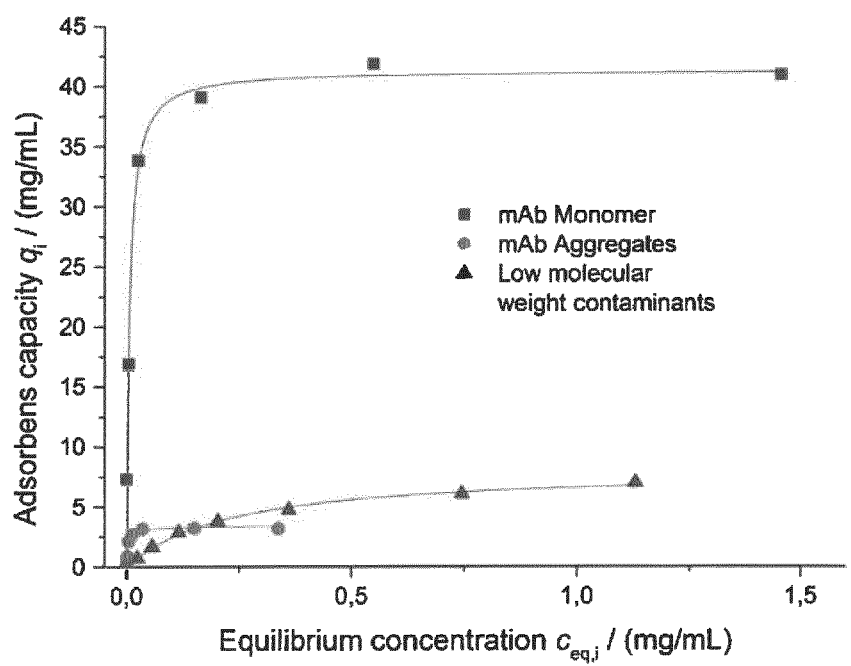
FIG. 6 shows equilibrium adsorption data for multiple components at a salt concentration of 20 mM for a hydrogel grafted short-cut (6 mm) fiber based chromatographic medium of Example 2a. The graphs represent Langmuir isotherm fits.

The resulting peaks of the obtained size exclusion chromatogram (see FIG. 5 for this Example) can be evaluated using a proper calibration to determine the concentration of the target components during the batch experiments as shown in FIG. 4. This leads to equilibrium adsorption data. An example is shown in FIG. 6 for a given salt concentration.

Figure 7:
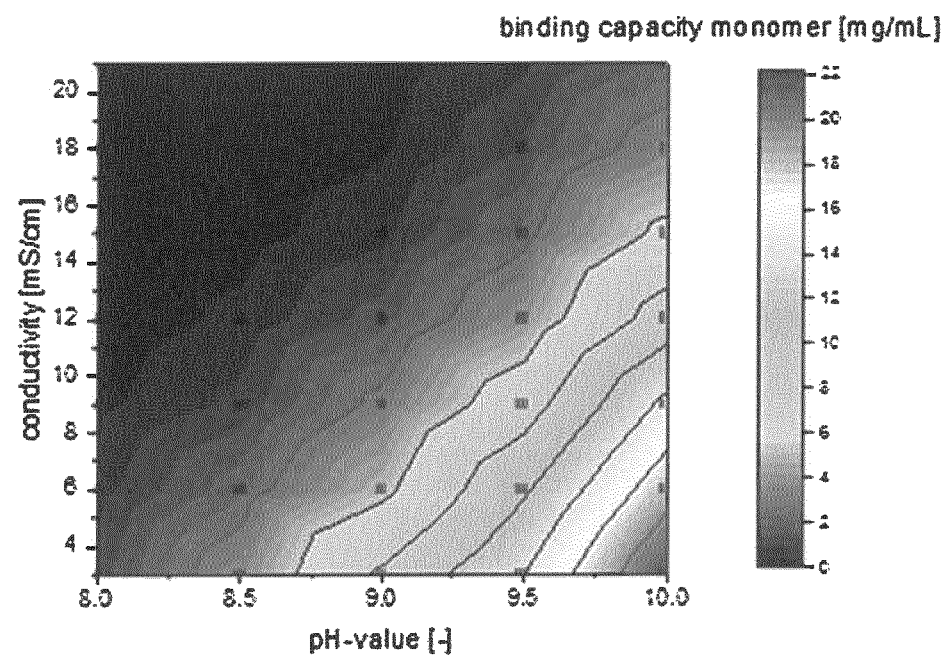
FIG. 7 shows an equilibrium adsorption data map for the monomer of a monoclonal antibody depending on conductivity and pH of Example 2b.
Figure 8:
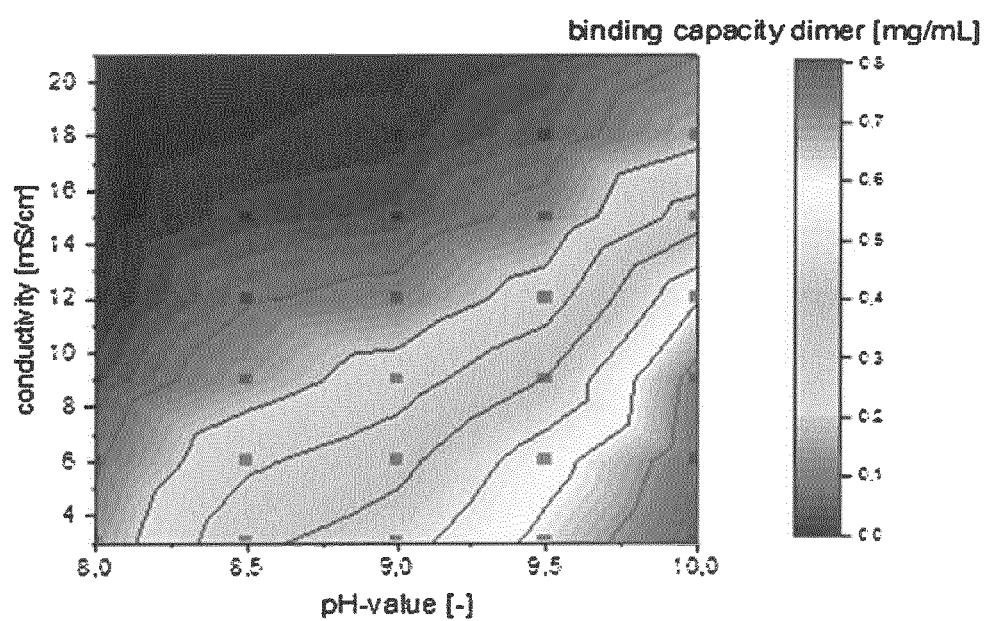
FIG. 8 shows an equilibrium adsorption data map for a dimer of a monoclonal antibody depending on conductivity and pH of Example 2b.

Exam Le 2b: Acquiring Equilibrium Adsorption Data for Varying Salt Concentrations and Varying pH In the above Example 2, only the salt concentration was varied. Following the same approach, other influencing factors like the pH can also be varied, resulting in multidimensional adsorption data maps. FIGS. 7 and 8 show equilibrium adsorption data for the monoclonal antibody IgQ and its dimer on Sartobind® Q depending on pH and salt concentration.

Example 3: Fitting of Data Sets to an SMA Isotherm (Step (Iia))

The data sets obtained in Example 2 were used to calculate protein characteristic charge $v_i$ and equilibrium constant k, furthermore the steric factor $\sigma_i$ was fitted using a computer-assisted least square regression at the three different salt concentrations ($c_s$=0.05, 0.15, 0.25 M) to an SMA adsorption isotherm to obtain the necessary adsorption model parameters in the investigated salt concentration area. The ionic capacity $\Lambda$ was 0.97 mol/L (Sartobind® Q).

$$c_i = \frac{q_i}{k} \cdot \left( \frac{c_1}{\Lambda - \sum_{i=2}^{n+1} (v_i + \sigma_i) q_i} \right)^{v_i}$$

Adsorption constant: k=7.55
Steric factor: $\sigma_i$=46.04
characteristic charge: $v_i$=2.72
Salt concentration: $c_1$=0.05 M

Example 4: Determining the Fluid Dynamic Behavior and Axial Dispersion Coefficient An Äkta™ Explorer from GE Healthcare was selected as the chromatography device (step (id)).

Figure 9:
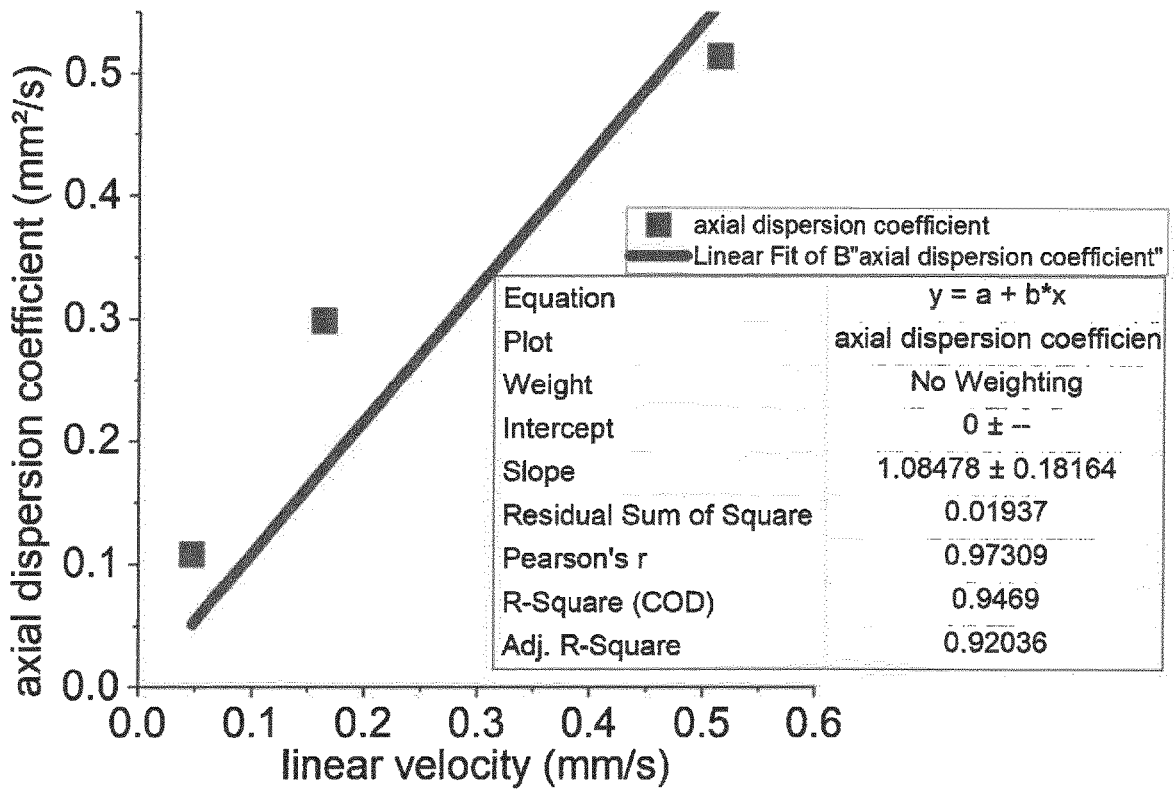
FIG. 9 shows the axial dispersion coefficient $D_{ax}$ of the chromatography bed depending on the linear flow velocity of Example 4.
Figure 10:
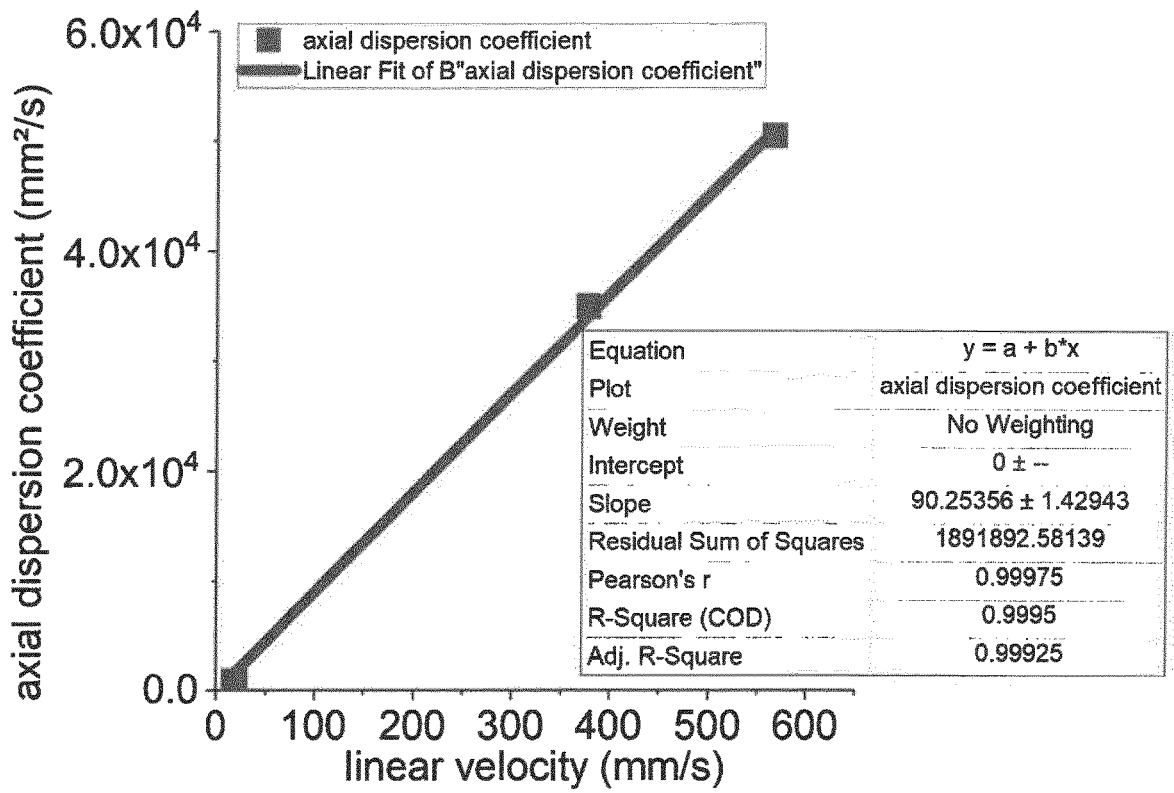
FIG. 10 shows the axial dispersion coefficient $D_{ax}^{DPF}$ of the DPF of the external system "ST+DPF" (see FIG. 1) depending on the linear flow velocity of Example 4.
Figure 13:
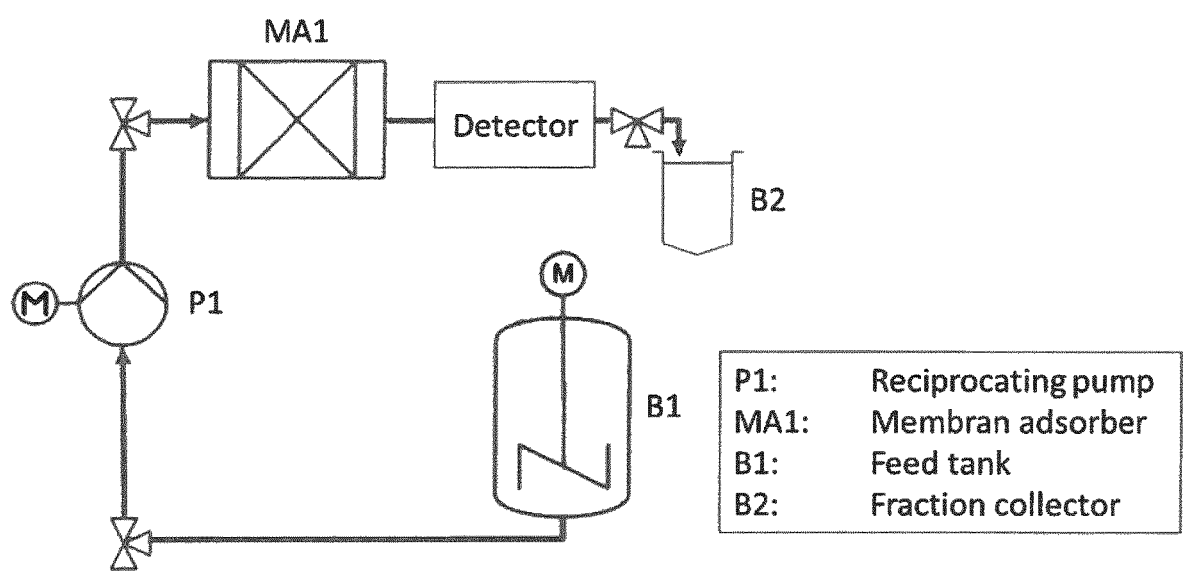
FIG. 13 shows an exemplary chromatographic set-up.

The parameters $V_{SYS}$, $V_{ST}$, $V_{DPF}$ and $D_{ax}^{DPF}$ were determined as follows. Pulse injections of acetone (2 vol % in reverse-osmosis-water) or mAb (4 mg/mL in potassium phosphate (KPi) buffer, 10 mM, 20 mM NaCl, pH=6) were carried out in the absence of the chromatographic medium. The experiments were performed using different volumetric flow rates and buffer conditions. The resulting peak signals were evaluated following the method of moments and regressed using a least squares fitting procedure to obtain the desired values. The results of this procedure are given in FIGS. 9 and 10.

Example 5: Prediction of a Protein Purification Process (Step (iv))

The model parameter sets obtained in Examples 2, 3 and 4 were used to predict the breakthrough curve for bovine serum albumin on Sartobind® Q.

The concentration of the at least one compound c(z, t) was calculated based on the following equations:

$$\frac{\partial c_{out}^{ST}}{\partial t} = \frac{F}{V_{ST}} (c_{in}^{ST} - c_{out}^{ST})$$

$$\frac{\partial c^{DPF}(z^{DPF}, t)}{\partial t} = -v \frac{\partial c^{DPF}(z^{DPF}, t)}{\partial z^{DPF}} + D_{ax}^{DPF} \frac{\partial^2 c^{DPF}(z^{DPF}, t)}{\partial (z^{DPF})^2}$$

$$\frac{\partial c(z, t)}{\partial t} = -\frac{(1-\varepsilon_b)}{\varepsilon_b} \cdot \frac{\partial q(z, t)}{\partial t} - v \frac{\partial c(z, t)}{\partial z} + D_{ax} \frac{\partial^2 c(z, t)}{\partial z^2}$$

wherein $V_{SYS} = V_{ST} + V_{DPF}$ $c\,(t=0, z) = 0$ $c_{out}^{ST} = c^{DPF}(z^{DPF} = 0, t) = c_{in}^{DPF}(t)$ $c^{DPF}(z^{DPF} = z_{max}^{DPF}, t) = c_{out}^{DPF} = c(z=0, t)$ Details for this procedure are provided above.

The corresponding experiment was carried out on an Äkta™ Explorer from GE Healthcare. A Sartobind® Q lab device with 2.8 cm diameter and a volume of 3.7 mL was equilibrated, loaded with $1.43 \cdot 10^{-5}$ M BSA solution and washed with 20 mM TRIS HCl buffer. The flow rate was 11 mL/min. Equilibration is 39 mL followed until 333 mL loading and a wash step until 388.5 mL. (Herein, "equilibration" is used to set the chromatographic media to binding conditions, "loading step" is the feed/protein solution loading onto the chromatographic medium and "wash step" refers to the flushing out of unbound components.) The obtained liquid chromatography (LC) signal was compared to the simulation results at 1%, 5% and 10% breakthrough. The breakthrough can be given in a percentage value, wherein a breakthrough of X % refers to the total volume of the mobile phase that has left the chromatography device via the outlet at which X % of the compound have left the device along with the mobile phase.

| Breakthrough [%] | Experiment [mL] | Simulation [mL] | Deviation % |
|---|---|---|---|
| 1 | 135.7 | 123.69 | 9 |
| 5 | 140.4 | 131.26 | 7 |
| 10 | 144.39 | 139.4 | 3 |

For all compared breakthrough points a high prediction accuracy was achieved (>90%). The result is displayed in FIG. 11.

Example 6: Fitting of Data Sets to a Langmuir Isotherm (Step (Iia))

A data set of equilibrium adsorption data obtained for IVIG on a hydrogel grafted chromatographic membrane was fitted to a Langmuir isotherm taking account of different NaCl concentrations. The results are shown in FIGS. 12(*a*) to 12(*c*).

As can be taken from FIG. 12(*a*), a Langmuir fit approximates the isotherm adsorption data with high accuracy.

The invention claimed is:

1. A method of determining the concentration of at least one compound in a chromatography method comprising the steps of
   selecting the at least one compound;
   selecting a stationary phase;
   selecting a mobile phase;
   selecting a chromatography device having a chromatography bed comprising the stationary phase and the mobile phase;
   obtaining an adsorption isotherm of the at least one compound on the stationary phase;
   obtaining the maximum diffusion time $t_{diff}$ of the at least one compound in the mobile phase;
   selecting a minimum residence time $t_{res}$ of the at least one compound in the chromatography bed such that Equation I is satisfied $$t_{res} > t_{diff} \qquad \text{Equation I}$$

calculating a concentration c(z, t) of the at least one compound in the mobile phase at a predetermined location z of the chromatography bed and at a predetermined time t based on the adsorption isotherm,
   wherein the calculation step is carried out without taking the diffusion of the at least one compound in the mobile phase into account.

2. The method according to claim 1, wherein the minimum residence time $t_{res}$ of the compound in the chromatography bed is selected such that Equation I-1 is satisfied $$t_{res} > 2 \cdot t_{diff} \qquad \text{Equation I-1.}$$

3. The method according to claim 1,
wherein in the calculation step, c(z, t) is calculated based on the following equation $$\frac{\partial c(z,t)}{\partial t} = Z$$

wherein Z is a sum including the following terms $$-\frac{(1-\varepsilon_b)}{\varepsilon_b} \cdot \frac{\partial q(z,t)}{\partial t}$$

and $$-v \frac{\partial c(z,t)}{\partial z}$$

wherein
q(z, t) represents the binding capacity of the at least one compound by the stationary phase,
$\varepsilon_b$ is the bulk porosity of the chromatography bed, and
v is the velocity of the mobile phase in the chromatography bed.

4. The method according to claim 3,
wherein the sum Z further includes the term $$+D_{ax} \frac{\partial^2 c(z,t)}{\partial z^2}$$

wherein $D_{ax}$ is the axial dispersion coefficient of the at least one compound in the chromatography bed.

5. The method according to claim 1, wherein the step of obtaining the adsorption isotherm involves one or more laboratory experiments.

6. The method according to claim 1, wherein the residence time $t_{res}$ is 2.5 to 20.0 seconds.

7. The method according to claim 1, wherein the stationary phase is a chromatography membrane or a monolith.

8. The method according to claim 1, wherein the at least one compound comprises a protein and/or a drug.

9. A method of obtaining at least one chromatography method parameter, selected from the group consisting of stationary phase, mobile phase and chromatography device, comprising the steps of
(I) executing the method according to claim 1 for n times, wherein n is an integer of 2 or more, wherein the n executions differ from one another with respect to at least one of the stationary phase selection step, the mobile phase selection step, and the chromatography device selection step; and
(II) selecting at least one stationary phase, at least one mobile phase, and/or at least one chromatography device based on the result of step (I).

10. The method according to claim 9, wherein step (I) is carried out such that in each of the n executions, the selection of the at least one compound comprises selecting at least two different compounds and in each of the n executions the at least two different compounds are the same.

11. A chromatography method comprising the method of determining the concentration of at least one compound in a chromatography method according to claim 1, and further comprising:
carrying out the chromatography.

12. The chromatography method according to claim 11, wherein the calculation step includes calculating the concentration of the compound in the mobile phase at the outlet of the chromatography device $c_{out}(t)$ at several points in time t and the carrying out the chromatography step includes collecting the mobile phase at a time t where $c_{out}(t) > 0.0$ mmol/L.

13. A chromatography method comprising the method of obtaining at least one chromatography method parameter according to claim 9, and further comprising:
carrying out the chromatography based on the at least one chromatography parameter selected from the at least one stationary phase, at least one mobile phase, and/or at least one chromatography device in step (II).

14. A chromatography method comprising the method of obtaining at least one chromatography method parameter according to claim 10, and further comprising:
carrying out the chromatography based on the at least one chromatography parameter selected from the at least one stationary phase, at least one mobile phase, and/or at least one chromatography device in step (II).

* * * * *